US012774355B2

(12) United States Patent
Isaka et al.

(10) Patent No.: US 12,774,355 B2
(45) Date of Patent: Oct. 27, 2026

(54) FLUORINE-CONTAINING COPOLYMER

(71) Applicant: DAIKIN INDUSTRIES, LTD., Osaka (JP)

(72) Inventors: Tadaharu Isaka, Osaka (JP); Yukari Yamamoto, Osaka (JP); Yumi Zenke, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 498 days.

(21) Appl. No.: 18/451,227

(22) Filed: Aug. 17, 2023

(65) Prior Publication Data

US 2023/0399430 A1 Dec. 14, 2023

Related U.S. Application Data

(63) Continuation of application No. PCT/JP2022/008443, filed on Feb. 28, 2022.

(30) Foreign Application Priority Data

Feb. 26, 2021 (JP) ................................ 2021-031104

(51) Int. Cl.

*C08F 214/26* (2006.01)
*C08J 5/18* (2006.01)
*C09D 127/18* (2006.01)
*H01B 3/44* (2006.01)

(52) U.S. Cl.

CPC ............. *C08F 214/262* (2013.01); *C08J 5/18* (2013.01); *C09D 127/18* (2013.01); *H01B 3/445* (2013.01); *C08F 2800/10* (2013.01); *C08J 2327/18* (2013.01)

(58) Field of Classification Search

CPC ................ C08F 214/262; C08F 214/28; C08F 216/1408; C08F 2800/10; C08F 8/20; C08J 5/18; C08J 2327/18; C09D 127/18; H01B 3/445; H01B 7/02

See application file for complete search history.

(56) References Cited

U.S. PATENT DOCUMENTS

| | | | |
|---|---|---|---|
| 3,085,083 A | 4/1963 | Schreyer | |
| 4,029,868 A * | 6/1977 | Carlson .............. | C08F 214/262 526/247 |
| 4,105,716 A | 8/1978 | Sakai et al. | |
| 4,262,101 A | 4/1981 | Hartwimmer et al. | |
| 4,546,157 A | 10/1985 | Nakagawa et al. | |
| 4,552,925 A | 11/1985 | Nakagawa et al. | |
| 4,587,316 A | 5/1986 | Nakagawa et al. | |
| H130 H | 9/1986 | McDermott et al. | |
| 4,703,095 A | 10/1987 | Nakagawa et al. | |
| 4,902,444 A | 2/1990 | Kolouch | |
| 5,000,875 A | 3/1991 | Kolouch | |
| 5,571,462 A | 11/1996 | Hashimoto et al. | |
| 5,677,404 A | 10/1997 | Blair | |
| 5,703,185 A | 12/1997 | Blair | |
| 5,817,419 A | 10/1998 | Fryd et al. | |
| 5,888,424 A | 3/1999 | Ebnesajjad et al. | |
| 6,689,833 B1 | 2/2004 | Bidstrup et al. | |
| 6,734,236 B1 | 5/2004 | Tomihashi et al. | |
| 7,592,406 B2 | 9/2009 | Kenny et al. | |
| 11,926,753 B2 | 3/2024 | Imamura et al. | |
| 2003/0013791 A1 | 1/2003 | Blong et al. | |
| 2003/0026995 A1 | 2/2003 | Duchesne et al. | |
| 2003/0102593 A1 | 6/2003 | Kaulbach et al. | |
| 2003/0153701 A1 | 8/2003 | Kono et al. | |
| 2003/0220458 A1 | 11/2003 | Taira et al. | |
| 2004/0072935 A1 | 4/2004 | Blong et al. | |
| 2004/0204536 A1 | 10/2004 | Miyatani et al. | |
| 2004/0242819 A1 | 12/2004 | Earnest, Jr. et al. | |
| 2004/0254300 A1 | 12/2004 | Namimatsu et al. | |
| 2004/0260044 A1 * | 12/2004 | Earnest, Jr. ............ | H01B 3/445 526/253 |
| 2005/0020792 A1 | 1/2005 | Aoyama et al. | |
| 2005/0080211 A1 | 4/2005 | Earnest, Jr. et al. | |
| 2005/0118431 A1 | 6/2005 | Kono et al. | |
| 2005/0187328 A1 | 8/2005 | Globus et al. | |
| 2005/0245707 A1 | 11/2005 | Arase et al. | |
| 2006/0276604 A1 | 12/2006 | Earnest, Jr. et al. | |
| 2007/0092714 A1 | 4/2007 | Namimatsu et al. | |
| 2007/0092715 A1 | 4/2007 | Namimatsu et al. | |
| 2007/0149734 A1 | 6/2007 | Sakakibara et al. | |

(Continued)

FOREIGN PATENT DOCUMENTS

| | | |
|---|---|---|
| CA | 1 248 292 A | 1/1989 |
| CN | 1382163 A | 11/2002 |

(Continued)

OTHER PUBLICATIONS

Extended European Search Report dated Feb. 16, 2026 in application No. 23 780 910.8.
Extended European Search Report dated Feb. 23, 2026 in application No. 23 780 961.1.
Extended European Search Report dated Mar. 11, 2026 in application No. 23 780 927.2.
Extended European Search Report dated Mar. 11, 2026 in application No. 23 780 956.1.
Extended European Search Report dated Mar. 11, 2026 in application No. 23 780 962.9.

(Continued)

*Primary Examiner* — Alicia Bland

(74) *Attorney, Agent, or Firm* — Sughrue Mion, PLLC

(57) ABSTRACT

There is provided a fluorine-containing copolymer comprising tetrafluoroethylene unit, hexafluoropropylene unit, and a perfluoro(propyl vinyl ether) unit, wherein the copolymer has a content of the hexafluoropropylene unit of 4.10 to 5.20 mol % with respect to the whole of the monomer units, a content of the perfluoro(propyl vinyl ether) unit of 0.53 to 0.86 mol % with respect to the whole of the monomer units, and a melt flow rate at 372° C. of 0.7 to 2.5 g/10 min.

9 Claims, No Drawings

(56) References Cited

U.S. PATENT DOCUMENTS

| | | | | |
|---|---|---|---|---|
| 2007/0243388 | A1 | 10/2007 | Kono et al. | |
| 2007/0292685 | A1 | 12/2007 | Brothers et al. | |
| 2008/0038627 | A1 | 2/2008 | Yamauchi et al. | |
| 2008/0090065 | A1 | 4/2008 | Kenny et al. | |
| 2008/0166091 | A1 | 7/2008 | Aoyagi et al. | |
| 2008/0200627 | A1 | 8/2008 | Funaki et al. | |
| 2008/0241534 | A1 | 10/2008 | Ohtani et al. | |
| 2008/0293904 | A1 | 11/2008 | Earnest, Jr. et al. | |
| 2009/0044965 | A1 | 2/2009 | Kono et al. | |
| 2009/0152776 | A1 | 6/2009 | Aten et al. | |
| 2009/0200711 | A1 | 8/2009 | Aten et al. | |
| 2009/0219243 | A1 | 9/2009 | Chen | |
| 2009/0233052 | A1 | 9/2009 | Thuot et al. | |
| 2010/0009075 | A1 | 1/2010 | Chandler et al. | |
| 2010/0212929 | A1* | 8/2010 | Ishii | H01B 7/295 174/110 SR |
| 2010/0314153 | A1* | 12/2010 | Ishii | H01B 3/445 428/141 |
| 2010/0314154 | A1 | 12/2010 | Kitahara et al. | |
| 2011/0287202 | A1 | 11/2011 | Ichisaka et al. | |
| 2012/0058256 | A1 | 3/2012 | Earnest, Jr. et al. | |
| 2012/0231196 | A1 | 9/2012 | Ichisaka et al. | |
| 2013/0230645 | A1 | 9/2013 | Kitahara et al. | |
| 2014/0255703 | A1 | 9/2014 | Aten et al. | |
| 2015/0047874 | A1 | 2/2015 | Thuot et al. | |
| 2015/0141581 | A1 | 5/2015 | Brothers et al. | |
| 2015/0175757 | A1 | 6/2015 | Aten et al. | |
| 2016/0005506 | A1 | 1/2016 | Isaka et al. | |
| 2016/0319089 | A1 | 11/2016 | Imamura et al. | |
| 2016/0322128 | A1 | 11/2016 | Imamura et al. | |
| 2017/0008986 | A1 | 1/2017 | Isaka et al. | |
| 2017/0025204 | A1 | 1/2017 | Chapman et al. | |
| 2017/0204233 | A1 | 7/2017 | Nakanishi et al. | |
| 2017/0260344 | A1 | 9/2017 | Imamura et al. | |
| 2018/0016375 | A1 | 1/2018 | Duchesne et al. | |
| 2018/0030183 | A1 | 2/2018 | Duchesne et al. | |
| 2018/0057625 | A1 | 3/2018 | Hintzer et al. | |
| 2018/0265654 | A1 | 9/2018 | Imamura et al. | |
| 2019/0085142 | A1 | 3/2019 | Kasai et al. | |
| 2019/0177453 | A1 | 6/2019 | Isaka et al. | |
| 2019/0382544 | A1 | 12/2019 | Yokotani et al. | |
| 2020/0123377 | A1 | 4/2020 | Nakanishi et al. | |
| 2020/0332037 | A1 | 10/2020 | Isaka et al. | |
| 2021/0024769 | A1 | 1/2021 | Imamura et al. | |
| 2021/0032201 | A1 | 2/2021 | Isaka | |
| 2021/0115224 | A1 | 4/2021 | Kato et al. | |
| 2021/0206970 | A1 | 7/2021 | Saigusa et al. | |
| 2021/0246237 | A1 | 8/2021 | Isaka et al. | |
| 2022/0169830 | A1 | 6/2022 | Kato et al. | |
| 2022/0181689 | A1 | 6/2022 | Isaka et al. | |
| 2022/0181698 | A1 | 6/2022 | Isaka et al. | |
| 2022/0181729 | A1 | 6/2022 | Isaka et al. | |
| 2022/0195087 | A1 | 6/2022 | Fukagawa et al. | |
| 2022/0195088 | A1 | 6/2022 | Imamura et al. | |
| 2022/0195169 | A1 | 6/2022 | Kuwajima et al. | |
| 2022/0278403 | A1 | 9/2022 | Isaka et al. | |
| 2023/0382026 | A1 | 11/2023 | Isaka et al. | |
| 2023/0390978 | A1 | 12/2023 | Tsuda et al. | |
| 2023/0391913 | A1 | 12/2023 | Isaka et al. | |
| 2023/0391914 | A1 | 12/2023 | Isaka et al. | |
| 2023/0391915 | A1 | 12/2023 | Isaka et al. | |
| 2023/0391916 | A1 | 12/2023 | Isaka et al. | |
| 2023/0391918 | A1 | 12/2023 | Isaka et al. | |
| 2023/0391919 | A1 | 12/2023 | Isaka et al. | |
| 2023/0391921 | A1 | 12/2023 | Isaka et al. | |
| 2023/0391922 | A1 | 12/2023 | Isaka et al. | |
| 2023/0391923 | A1 | 12/2023 | Isaka et al. | |
| 2023/0391924 | A1 | 12/2023 | Yamamoto et al. | |
| 2023/0391925 | A1 | 12/2023 | Isaka et al. | |
| 2023/0391926 | A1 | 12/2023 | Isaka et al. | |
| 2023/0391928 | A1 | 12/2023 | Isaka et al. | |
| 2023/0391930 | A1 | 12/2023 | Isaka et al. | |
| 2023/0399427 | A1 | 12/2023 | Isaka et al. | |
| 2023/0399428 | A1 | 12/2023 | Isaka et al. | |
| 2023/0399429 | A1 | 12/2023 | Isaka et al. | |
| 2023/0399431 | A1 | 12/2023 | Isaka et al. | |
| 2023/0399433 | A1 | 12/2023 | Isaka et al. | |
| 2023/0399434 | A1 | 12/2023 | Isaka et al. | |
| 2023/0399435 | A1 | 12/2023 | Isaka et al. | |
| 2023/0399436 | A1 | 12/2023 | Isaka et al. | |
| 2023/0399437 | A1 | 12/2023 | Isaka et al. | |
| 2023/0399439 | A1 | 12/2023 | Isaka et al. | |
| 2023/0399440 | A1 | 12/2023 | Isaka et al. | |
| 2023/0399442 | A1 | 12/2023 | Isaka et al. | |
| 2023/0406977 | A1 | 12/2023 | Isaka et al. | |
| 2023/0416431 | A1 | 12/2023 | Isaka et al. | |
| 2024/0018285 | A1 | 1/2024 | Isaka et al. | |
| 2025/0002623 | A1 | 1/2025 | Isaka et al. | |
| 2025/0002624 | A1 | 1/2025 | Isaka et al. | |
| 2025/0011486 | A1 | 1/2025 | Isaka et al. | |
| 2025/0011487 | A1 | 1/2025 | Isaka et al. | |
| 2025/0011489 | A1 | 1/2025 | Isaka et al. | |
| 2025/0011491 | A1 | 1/2025 | Isaka et al. | |
| 2025/0011492 | A1 | 1/2025 | Isaka et al. | |
| 2025/0011493 | A1 | 1/2025 | Isaka et al. | |
| 2025/0011494 | A1 | 1/2025 | Isaka et al. | |
| 2025/0011495 | A1 | 1/2025 | Isaka et al. | |
| 2025/0011497 | A1 | 1/2025 | Isaka et al. | |
| 2025/0011501 | A1 | 1/2025 | Isaka et al. | |
| 2025/0011502 | A1 | 1/2025 | Isaka et al. | |
| 2025/0011503 | A1 | 1/2025 | Isaka et al. | |
| 2025/0011504 | A1 | 1/2025 | Isaka et al. | |
| 2025/0011505 | A1 | 1/2025 | Isaka et al. | |
| 2025/0011506 | A1 | 1/2025 | Isaka et al. | |
| 2025/0019477 | A1 | 1/2025 | Isaka et al. | |
| 2025/0034301 | A1 | 1/2025 | Isaka et al. | |
| 2025/0145746 | A1 | 5/2025 | Isaka et al. | |
| 2025/0145816 | A1 | 5/2025 | Isaka et al. | |
| 2025/0282902 | A1 | 9/2025 | Yamamoto et al. | |

FOREIGN PATENT DOCUMENTS

| | | | |
|---|---|---|---|
| CN | 1390236 | A | 1/2003 |
| CN | 1527852 | A | 9/2004 |
| CN | 1958646 | A | 5/2007 |
| CN | 101472965 | A | 7/2009 |
| CN | 101945927 | A | 1/2011 |
| CN | 105900186 | A | 8/2016 |
| CN | 105980426 | A | 9/2016 |
| CN | 106536631 | A | 3/2017 |
| CN | 107406550 | A | 11/2017 |
| CN | 110790854 | A | 2/2020 |
| CN | 111699173 | A | 9/2020 |
| EP | 1 063 245 | A1 | 12/2000 |
| EP | 1 260 526 | A1 | 11/2002 |
| EP | 1 262 496 | A1 | 12/2002 |
| EP | 1 170 303 | B1 | 7/2007 |
| EP | 3091042 | A1 | 11/2016 |
| JP | 52-73994 | A | 6/1977 |
| JP | 52-109588 | A | 9/1977 |
| JP | 58-69213 | A | 4/1983 |
| JP | 59-2821 | B2 | 1/1984 |
| JP | 60-23689 | B2 | 6/1985 |
| JP | 60-240713 | A | 11/1985 |
| JP | 62-24444 | B2 | 5/1987 |
| JP | 62-192411 | A | 8/1987 |
| JP | 63-1963 | B2 | 1/1988 |
| JP | 2-129253 | A | 5/1990 |
| JP | 03-122907 | A | 5/1991 |
| JP | 05-151846 | A | 6/1993 |
| JP | 6-40813 | B2 | 6/1994 |
| JP | 9-52920 | A | 2/1997 |
| JP | 10-292054 | A | 11/1998 |
| JP | 11-512217 | A | 10/1999 |
| JP | 11-513052 | A | 11/1999 |
| JP | 2000-281939 | A | 10/2000 |
| JP | 2001-501551 | A | 2/2001 |
| JP | 2002-265522 | A | 9/2002 |
| JP | 2002-293831 | A | 10/2002 |
| JP | 2004-502853 | A | 1/2004 |
| JP | 2005-320497 | A | 11/2005 |
| JP | 2006-528274 | A | 12/2006 |
| JP | 2007-15364 | A | 1/2007 |
| JP | 2008-66254 | A | 3/2008 |

(56) References Cited

FOREIGN PATENT DOCUMENTS

| | | | |
|---|---|---|---|
| JP | 2009-540105 | A | 11/2009 |
| JP | 2010-53209 | A | 3/2010 |
| JP | 2010-507272 | A | 3/2010 |
| JP | 2010-95575 | A | 4/2010 |
| JP | 2010-179611 | A | 8/2010 |
| JP | 2010-180366 | A | 8/2010 |
| JP | 2010-229163 | A | 10/2010 |
| JP | 2011-506140 | A | 3/2011 |
| JP | 2011-508681 | A | 3/2011 |
| JP | 2011-514407 | A | 5/2011 |
| JP | 2011-514650 | A | 5/2011 |
| JP | 4882194 | B2 | 2/2012 |
| JP | 4968338 | B2 | 7/2012 |
| JP | 2013-100532 | A | 5/2013 |
| JP | 5273048 | B2 | 8/2013 |
| JP | 2013-191527 | A | 9/2013 |
| JP | 2014-28952 | A | 2/2014 |
| JP | 2014-28953 | A | 2/2014 |
| JP | 2014-224228 | A | 12/2014 |
| JP | 2015-54431 | A | 3/2015 |
| JP | 2015-516029 | A | 6/2015 |
| JP | 2015-147924 | A | 8/2015 |
| JP | 2016-516608 | A | 6/2016 |
| JP | 2016-135862 | A | 7/2016 |
| JP | 2017-503052 | A | 1/2017 |
| JP | 6134818 | B2 | 5/2017 |
| JP | 2017-197690 | A | 11/2017 |
| JP | 2018-523272 | A | 8/2018 |
| JP | 2019-194314 | A | 11/2019 |
| JP | 2020-100823 | A | 7/2020 |
| JP | 2021-141045 | A | 9/2021 |
| JP | 2022-132204 | A | 9/2022 |
| JP | 2022-132205 | A | 9/2022 |
| JP | 2022-132206 | A | 9/2022 |
| JP | 2022-132207 | A | 9/2022 |
| JP | 2022-132208 | A | 9/2022 |
| JP | 2022-132209 | A | 9/2022 |
| JP | 2022-132212 | A | 9/2022 |
| JP | 2022-132213 | A | 9/2022 |
| JP | 2022-132214 | A | 9/2022 |
| JP | 2022-132215 | A | 9/2022 |
| JP | 2022-132217 | A | 9/2022 |
| JP | 2022-132218 | A | 9/2022 |
| JP | 2022-132219 | A | 9/2022 |
| JP | 2022-132220 | A | 9/2022 |
| JP | 2022-132221 | A | 9/2022 |
| JP | 2022-132222 | A | 9/2022 |
| JP | 2022-132223 | A | 9/2022 |
| JP | 2022-132224 | A | 9/2022 |
| JP | 2022-132225 | A | 9/2022 |
| JP | 2022-132226 | A | 9/2022 |
| JP | 2022-132227 | A | 9/2022 |
| JP | 2022-132228 | A | 9/2022 |
| JP | 2022-132229 | A | 9/2022 |
| JP | 2022-132233 | A | 9/2022 |
| WO | 91/09912 | A1 | 7/1991 |
| WO | 97/39890 | A1 | 10/1997 |
| WO | 99/46309 | A1 | 9/1999 |
| WO | 01/18076 | A1 | 3/2001 |
| WO | 01/36504 | A1 | 5/2001 |
| WO | 03/006566 | A1 | 1/2003 |
| WO | 03/022922 | A1 | 3/2003 |
| WO | 03/048214 | A1 | 6/2003 |
| WO | 2004/052987 | A1 | 6/2004 |
| WO | 2005/052015 | A1 | 6/2005 |
| WO | 2006/123694 | A1 | 11/2006 |
| WO | 2008/047759 | A1 | 4/2008 |
| WO | 2008/047906 | A1 | 4/2008 |
| WO | 2009/044753 | A1 | 4/2009 |
| WO | 2009/102660 | A1 | 8/2009 |
| WO | 2014/007348 | A1 | 1/2014 |
| WO | 2015/104974 | A1 | 7/2015 |
| WO | 2015/119053 | A1 | 8/2015 |
| WO | 2016/130894 | A1 | 8/2016 |
| WO | 2018/008563 | A1 | 1/2018 |
| WO | 2018/181898 | A1 | 10/2018 |
| WO | 2018/216284 | A1 | 11/2018 |
| WO | 2019/008998 | A1 | 1/2019 |
| WO | 2019/159652 | A1 | 8/2019 |
| WO | 2019/187725 | A1 | 10/2019 |
| WO | 2019/225694 | A1 | 11/2019 |
| WO | 2020/129083 | A1 | 6/2020 |
| WO | 2021/039865 | A1 | 3/2021 |
| WO | 2021/054364 | A1 | 3/2021 |

OTHER PUBLICATIONS

Extended European Search Report dated Mar. 11, 2026 in application No. 23 780 963.7.

Extended European Search Report dated Mar. 11, 2026 in application No. 23 780 970.2.

Extended European Search Report dated Mar. 11, 2026 in application No. 23 780 964.5.

Extended European Search Report dated Mar. 11, 2026 in application No. 23 780 968.6.

Extended European Search Report dated Mar. 11, 2026 in application No. 23 780 908.2.

Extended European Search Report dated Mar. 11, 2026 in application No. 23 780 926.4.

Extended European Search Report dated Mar. 11, 2026 in application No. 23 780 957.9.

Extended European Search Report dated Mar. 16, 2026 in application No. 23 780 965.2.

International Preliminary Report on Patentability, with Translation of Written Opinion issued Sep. 24, 2024 in International Application No. PCT/JP2023/013251.

International Preliminary Report on Patentability, with Translation of Written Opinion issued Sep. 24, 2024 in International Application No. PCT/JP2023/013252.

International Preliminary Report on Patentability, with Translation of Written Opinion issued Sep. 24, 2024 in International Application No. PCT/JP2023/013253.

International Preliminary Report on Patentability, with Translation of Written Opinion issued Sep. 24, 2024 in International Application No. PCT/JP2023/013254.

International Preliminary Report on Patentability, with Translation of Written Opinion issued Sep. 24, 2024 in International Application No. PCT/JP2023/013281.

International Preliminary Report on Patentability, with Translation of Written Opinion issued Sep. 24, 2024 in International Application No. PCT/JP2023/013282.

International Preliminary Report on Patentability, with Translation of Written Opinion issued Sep. 24, 2024 in International Application No. PCT/JP2023/013283.

International Preliminary Report on Patentability, with Translation of Written Opinion issued Sep. 24, 2024 in International Application No. PCT/JP2023/013334.

International Preliminary Report on Patentability, with Translation of Written Opinion issued Sep. 24, 2024 in International Application No. PCT/JP2023/013335.

International Preliminary Report on Patentability, with Translation of Written Opinion issued Sep. 24, 2024 in International Application No. PCT/JP2023/013341.

International Preliminary Report on Patentability, with Translation of Written Opinion issued Sep. 24, 2024 in International Application No. PCT/JP2023/013342.

International Preliminary Report on Patentability, with Translation of Written Opinion issued Sep. 24, 2024 in International Application No. PCT/JP2023/013343.

International Preliminary Report on Patentability, with Translation of Written Opinion issued Sep. 24, 2024 in International Application No. PCT/JP2023/013344.

International Preliminary Report on Patentability, with Translation of Written Opinion issued Sep. 24, 2024 in International Application No. PCT/JP2023/013345.

International Preliminary Report on Patentability, with Translation of Written Opinion issued Sep. 24, 2024 in International Application No. PCT/JP2023/013346.

(56) References Cited

OTHER PUBLICATIONS

International Preliminary Report on Patentability, with Translation of Written Opinion issued Sep. 24, 2024 in International Application No. PCT/JP2023/013347.
International Preliminary Report on Patentability, with Translation of Written Opinion issued Sep. 24, 2024 in International Application No. PCT/JP2023/013348.
International Preliminary Report on Patentability, with Translation of Written Opinion issued Sep. 24, 2024 in International Application No. PCT/JP2023/013349.
International Preliminary Report on Patentability, with Translation of Written Opinion issued Sep. 24, 2024 in International Application No. PCT/JP2023/013350.
Anonymous: "TeflonTM FEP 100 Molding and Extrusion Resin", Jan. 1, 2015, pp. 1-2.
Anonymous: "TeflonTM FEP 9302 Molding and Extrusion Resin", Jan. 1, 2015, pp. 1-2.
Extended European Search Report and Search Opinion received for European Application No. 22759854.7, mailed on Feb. 10, 2025, 6 pages.
Extended European Search Report and Search Opinion received for European Application No. 22759855.4, mailed on Jan. 23, 2025, 6 pages.
Extended European Search Report and Search Opinion received for European Application No. 22759856.2, mailed on Jan. 30, 2025, 9 pages.
Extended European Search Report and Search Opinion received for European Application No. 22759857.0, mailed on Jan. 30, 2025, 10 pages.
Extended European Search Report and Search Opinion received for European Application No. 22759858.8, mailed on Jan. 30, 2025, 10 pages.
Extended European Search Report and Search Opinion received for European Application No. 22759859.6, mailed on Feb. 10, 2025, 6 pages.
Extended European Search Report and Search Opinion received for European Application No. 22759861.2, mailed on Feb. 10, 2025, 6 pages.
Extended European Search Report and Search Opinion received for European Application No. 22759862.0, mailed on Feb. 10, 2025, 6 pages.
Extended European Search Report and Search Opinion received for European Application No. 22759865.3, mailed on Jan. 30, 2025, 5 pages.
Extended European Search Report and Search Opinion received for European Application No. 22759866.1, mailed on Feb. 10, 2025, 5 pages.
Extended European Search Report and Search Opinion received for European Application No. 22759867.9, mailed on Jan. 16, 2025, 8 pages.
Extended European Search Report and Search Opinion received for European Application No. 22759868.7, mailed on Jan. 20, 2025, 8 pages.
Extended European Search Report and Search Opinion received for European Application No. 22759869.5, mailed on Jan. 20, 2025, 8 pages.
Extended European Search Report and Search Opinion received for European Application No. 22759870.3, mailed on Jan. 28, 2025, 6 pages.
Extended European Search Report and Search Opinion received for European Application No. 22759872.9, mailed on Feb. 10, 2025, 7 pages.
Extended European Search Report and Search Opinion received for European Application No. 22759873.7, mailed on Feb. 10, 2025, 6 pages.
Extended European Search Report and Search Opinion received for European Application No. 22759874.5, mailed on Feb. 10, 2025, 8 pages.
Extended European Search Report and Search Opinion received for European Application No. 22759876.0, mailed on Jan. 30, 2025, 8 pages.
Extended European Search Report and Search Opinion received for European Application No. 22759877.8, mailed on Jan. 30, 2025, 7 pages.
Extended European Search Report and Search Opinion received for European Application No. 22759878.6, mailed on Feb. 10, 2025, 6 pages.
International Preliminary Report on Patentability received for PCT Patent Application No. PCT/JP2023/025948, mailed on Dec. 18, 2024, 4 pages.
International Preliminary Report on Patentability received for PCT Patent Application No. PCT/JP2023/025951, mailed on Dec. 18, 2024, 5 pages.
Translation of the International Search Report issued Apr. 26, 2022 in International Application No. PCT/JP2022/008436.
Translation of the International Search Report issued Apr. 26, 2022 in International Application No. PCT/JP2022/008437.
Translation of the International Search Report issued May 17, 2022 in International Application No. PCT/JP2022/008438.
Translation of the International Search Report issued May 17, 2022 in International Application No. PCT/JP2022/008439.
Translation of the International Search Report issued May 10, 2022 in International Application No. PCT/JP2022/008440.
Translation of the International Search Report issued May 10, 2022 in International Application No. PCT/JP2022/008441.
Translation of the International Search Report issued May 10, 2022 in International Application No. PCT/JP2022/008442.
Translation of the International Search Report issued May 10, 2022 in International Application No. PCT/JP2022/008443.
Translation of the International Search Report issued May 10, 2022 in International Application No. PCT/JP2022/008444.
Translation of the International Search Report issued May 10, 2022 in International Application No. PCT/JP2022/008445.
Translation of the International Search Report issued May 10, 2022 in International Application No. PCT/JP2022/008446.
Translation of the International Search Report issued May 10, 2022 in International Application No. PCT/JP2022/008447.
Translation of the International Search Report issued May 17, 2022 in International Application No. PCT/JP2022/008448.
Translation of the International Search Report issued May 17, 2022 in International Application No. PCT/JP2022/008449.
Translation of the International Search Report issued Apr. 12, 2022 in International Application No. PCT/JP2022/008450.
Translation of the International Search Report issued Apr. 12, 2022 in International Application No. PCT/JP2022/008451.
Translation of the International Search Report issued May 17, 2022 in International Application No. PCT/JP2022/008452.
Translation of the International Search Report issued Apr. 12, 2022 in International Application No. PCT/JP2022/008453.
Translation of the International Search Report issued May 10, 2022 in International Application No. PCT/JP2022/008454.
Translation of the International Search Report issued May 10, 2022 in International Application No. PCT/JP2022/008455.
Translation of the International Search Report issued Apr. 26, 2022 in International Application No. PCT/JP2022/008458.
Translation of the International Search Report issued Apr. 26, 2022 in International Application No. PCT/JP2022/008459.
Translation of the International Search Report issued Apr. 26, 2022 in International Application No. PCT/JP2022/008460.
Translation of the International Search Report issued Apr. 19, 2022 in International Application No. PCT/JP2022/008461.
Translation of the International Search Report issued May 10, 2022 in International Application No. PCT/JP2022/008462.
Translation of the International Search Report issued May 17, 2022 in International Application No. PCT/JP2022/008463.
Translation of the International Search Report issued May 17, 2022 in International Application No. PCT/JP2022/008466.
Translation of the International Search Report issued May 17, 2022 in International Application No. PCT/JP2022/008464.
Translation of the International Search Report issued May 17, 2022 in International Application No. PCT/JP2022/008465.

(56) References Cited

OTHER PUBLICATIONS

Translation of the International Search Report issued Apr. 26, 2022 in International Application No. PCT/JP2022/008467.
International Preliminary Report on Patentability, with Translation of Written Opinion issued Aug. 29, 2023 in International Application No. PCT/JP2022/008436.
International Preliminary Report on Patentability, with Translation of Written Opinion issued Aug. 29, 2023 in International Application No. PCT/JP2022/008437.
International Preliminary Report on Patentability, with Translation of Written Opinion issued Aug. 29, 2023 in International Application No. PCT/JP2022/008438.
International Preliminary Report on Patentability, with Translation of Written Opinion issued Aug. 29, 2023 in International Application No. PCT/JP2022/008439.
International Preliminary Report on Patentability, with Translation of Written Opinion issued Aug. 29, 2023 in International Application No. PCT/JP2022/008440.
International Preliminary Report on Patentability, with Translation of Written Opinion issued Aug. 29, 2023 in International Application No. PCT/JP2022/008441.
International Preliminary Report on Patentability, with Translation of Written Opinion issued Aug. 29, 2023 in International Application No. PCT/JP2022/008442.
International Preliminary Report on Patentability, with Translation of Written Opinion issued Aug. 29, 2023 in International Application No. PCT/JP2022/008443.
International Preliminary Report on Patentability, with Translation of Written Opinion issued Aug. 29, 2023 in International Application No. PCT/JP2022/008444.
International Preliminary Report on Patentability, with Translation of Written Opinion issued Aug. 29, 2023 in International Application No. PCT/JP2022/008445.
International Preliminary Report on Patentability, with Translation of Written Opinion issued Aug. 29, 2023 in International Application No. PCT/JP2022/008446.
International Preliminary Report on Patentability, with Translation of Written Opinion issued Aug. 29, 2023 in International Application No. PCT/JP2022/008447.
International Preliminary Report on Patentability, with Translation of Written Opinion issued Aug. 29, 2023 in International Application No. PCT/JP2022/008448.
International Preliminary Report on Patentability, with Translation of Written Opinion issued Aug. 29, 2023 in International Application No. PCT/JP2022/008449.
International Preliminary Report on Patentability, with Translation of Written Opinion issued Aug. 29, 2023 in International Application No. PCT/JP2022/008450.
International Preliminary Report on Patentability, with Translation of Written Opinion issued Aug. 29, 2023 in International Application No. PCT/JP2022/008451.
International Preliminary Report on Patentability, with Translation of Written Opinion issued Aug. 29, 2023 in International Application No. PCT/JP2022/008452.
International Preliminary Report on Patentability, with Translation of Written Opinion issued Aug. 29, 2023 in International Application No. PCT/JP2022/008453.
International Preliminary Report on Patentability, with Translation of Written Opinion issued Aug. 29, 2023 in International Application No. PCT/JP2022/008454.
International Preliminary Report on Patentability, with Translation of Written Opinion issued Aug. 29, 2023 in International Application No. PCT/JP2022/008455.
International Preliminary Report on Patentability, with Translation of Written Opinion issued Aug. 29, 2023 in International Application No. PCT/JP2022/008458.
International Preliminary Report on Patentability, with Translation of Written Opinion issued Aug. 29, 2023 in International Application No. PCT/JP2022/008459.
International Preliminary Report on Patentability, with Translation of Written Opinion issued Aug. 29, 2023 in International Application No. PCT/JP2022/008460.
International Preliminary Report on Patentability, with Translation of Written Opinion issued Aug. 29, 2023 in International Application No. PCT/JP2022/008461.
International Preliminary Report on Patentability, with Translation of Written Opinion issued Aug. 29, 2023 in International Application No. PCT/JP2022/008462.
International Preliminary Report on Patentability, with Translation of Written Opinion issued Aug. 29, 2023 in International Application No. PCT/JP2022/008463.
International Preliminary Report on Patentability, with Translation of Written Opinion issued Aug. 29, 2023 in International Application No. PCT/JP2022/008466.
International Preliminary Report on Patentability, with Translation of Written Opinion issued Aug. 29, 2023 in International Application No. PCT/JP2022/008464.
International Preliminary Report on Patentability, with Translation of Written Opinion issued Aug. 29, 2023 in International Application No. PCT/JP2022/008465.
International Preliminary Report on Patentability, with Translation of Written Opinion issued Aug. 29, 2023 in International Application No. PCT/JP2022/008467.
Translation of the International Search Report issued Jun. 20, 2023 in International Application No. PCT/JP2023/013334.
Translation of the International Search Report issued Jun. 20, 2023 in International Application No. PCT/JP2023/013335.
Translation of the International Search Report issued Jun. 20, 2023 in International Application No. PCT/JP2023/013341.
Translation of the International Search Report issued Jun. 20, 2023 in International Application No. PCT/JP2023/013342.
Translation of the International Search Report issued Jun. 6, 2023 in International Application No. PCT/JP2023/013349.
Translation of the International Search Report issued Jun. 20, 2023 in International Application No. PCT/JP2023/013343.
Translation of the International Search Report issued Jun. 6, 2023 in International Application No. PCT/JP2023/013350.
Translation of the International Search Report issued Jun. 20, 2023 in International Application No. PCT/JP2023/013344.
Translation of the International Search Report issued Jun. 20, 2023 in International Application No. PCT/JP2023/013345.
Translation of the International Search Report issued Jun. 6, 2023 in International Application No. PCT/JP2023/013346.
Translation of the International Search Report issued Jun. 6, 2023 in International Application No. PCT/JP2023/013347.
Translation of the International Search Report issued Jun. 6, 2023 in International Application No. PCT/JP2023/013348.
Translation of the International Search Report issued Jun. 20, 2023 in International Application No. PCT/JP2023/013253.
Translation of the International Search Report issued Jun. 20, 2023 in International Application No. PCT/JP2023/013251.
Translation of the International Search Report issued Jun. 20, 2023 in International Application No. PCT/JP2023/013252.
Translation of the International Search Report issued Jun. 20, 2023 in International Application No. PCT/JP2023/013254.
Translation of the International Search Report issued Jun. 13, 2023 in International Application No. PCT/JP2023/013255.
Translation of the International Search Report issued Jun. 20, 2023 in International Application No. PCT/JP2023/013281.
Translation of the International Search Report issued Jun. 20, 2023 in International Application No. PCT/JP2023/013282.
Translation of the International Search Report issued Jun. 20, 2023 in International Application No. PCT/JP2023/013283.
Translation of the International Search Report issued Aug. 15, 2023 in International Application No. PCT/JP2023/025951.
Translation of the International Search Report issued Aug. 15, 2023 in International Application No. PCT/JP2023/025948.
Lan Jun et al., "Study on Perfluoroalkyl Vinyl Ether Modified Poly(FEP) Resin", Chemical Production and Technology, Issue 1, Feb. 25, 2015, pp. 1-3 (4 pages total).

(56) References Cited

OTHER PUBLICATIONS

Extended European Search Report dated Jun. 8, 2026 in application No. 23839691.5.

* cited by examiner

FLUORINE-CONTAINING COPOLYMER

CROSS-REFERENCE TO RELATED APPLICATIONS

This application is a Rule 53(b) Continuation of International Application No. PCT/JP2022/008443 filed Feb. 28, 2022, which claims priority based on Japanese Patent Application No. 2021-031104 filed Feb. 26, 2021, the respective disclosures of which are incorporated herein by reference in their entirety.

TECHNICAL FIELD

The present disclosure relates to a fluorine-containing copolymer.

BACKGROUND ART

Patent Literature 1 describes a terpolymer containing (a) tetrafluoroethylene, (b) hexafluoropropylene in an amount of about 4 to about 12% by weight based on the weight of the terpolymer, and (c) perfluoro(ethyl vinyl ether) or perfluoro (n-propyl vinyl ether) in an amount of about 0.5 to about 3% by weight based on the weight of the terpolymer, in a copolymerized form.

RELATED ART

Patent Literature

Patent Literature 1: Japanese Patent Laid-Open No. 52-109588

SUMMARY

According to the present disclosure, there is provided a fluorine-containing copolymer comprising tetrafluoroethylene unit, hexafluoropropylene unit and perfluoro(propyl vinyl ether) unit, wherein the copolymer has a content of hexafluoropropylene unit of 4.10 to 20 mol % with respect to the whole of the monomer units, a content of perfluoro (propyl vinyl ether) unit of 0.53 to 0.86 mol % with respect to the whole of the monomer units and a melt flow rate at 372° C. of 0.7 to 2.5 g/10 min.

Effect

According to the present disclosure, there can be provided a fluorine-containing copolymer which is unlikely to deform even in a melt state, can easily give a thick sheet uniform in thickness, and can a give formed article which is unlikely to deform even when a load is applied continuously for a long term and is also excellent in the 80° C. abrasion resistance, the water vapor low permeability and the durability to repeated loads.

DESCRIPTION OF EMBODIMENTS

Hereinafter, specific embodiments of the present disclosure will be described in detail, but the present disclosure is not limited to the following embodiments.

A fluorine-containing copolymer of the present disclosure comprises tetrafluoroethylene (TFE) unit, hexafluoropropylene (HFP) unit and perfluoro(propyl vinyl ether) (PPVE) unit.

As fluororesins, non melt-processible fluororesins such as polytetrafluoroethylene (PTFE), and melt-fabricable fluororesins are known. PTFE, though having excellent properties, has such a drawback that the melt processing is remarkably difficult. Meanwhile, as the melt-fabricable fluororesins, TFE/HFP copolymers (FEP), TFE/PPVE copolymers (PFA) and the like are known; however, these have a drawback of being inferior in the heat resistance and the like to PTFE. Then, Patent Literature 1 proposes the above-mentioned terpolymer as a fluorocarbon polymer improved in these drawbacks.

However, the terpolymer proposed in Patent Literature 1 cannot fully satisfy the various properties required for thick sheet materials. Thick sheets made of melt-fabricable fluororesins are generally produced by extruding fluororesins using an extruder. Fluororesins in a melt state discharged from the extruder are likely to easily deform due to their own weight before they are cooled and solidified, thus posing a problem that it is not easy to produce sheets with the desired thickness when attempting to produce thick sheets. Thick sheets also pose a problem that they are likely to deform when a load is applied continuously over a long term, compared to thin sheets. Further, thick sheets are often used as machine components, requiring high-temperature abrasion resistance, water vapor low permeability, and durability to repeated loads.

It has been found that by regulating, in very limited ranges, the contents of HFP unit and PPVE unit of the fluorine-containing copolymer comprising TFE unit, HFP unit and PPVE unit, and the melt flow rate, the own weight deformation of the fluorine-containing copolymer in a melt state can be suppressed, and further, the resilience and the permanent compression set of formed articles obtained from such a fluorine-containing copolymer are improved. Accordingly, the fluorine-containing copolymer of the present disclosure is unlikely to deform even in a melt state, and by using the fluorine-containing copolymer of the present disclosure, thick sheets uniform in thickness can easily be obtained. Further, formed articles obtained by using the fluorine-containing copolymer of the present disclosure are unlikely to deform even when a load is applied continuously for a long term, and are also excellent in the 80° C. abrasion resistance, the water vapor low permeability and the durability to repeated loads.

Further, since the fluorine-containing copolymer of the present disclosure causes little own weight deformation even in a melt state, thick pipes made of the copolymer have clear cross-sections and uniform thicknesses.

The fluorine-containing copolymer of the present disclosure is a melt-fabricable fluororesin. Being melt-fabricable means that a polymer can be melted and processed by using a conventional processing device such as an extruder.

The content of the HFP unit of the fluorine-containing copolymer is, with respect to the whole of the monomer units, 4.10 to 5.20 mol %, and preferably 4.11 mol % or higher, more preferably 4.20 mol % or higher, still more preferably 4.30 mol % or higher and especially preferably 4.35 mol % or higher, and preferably 5.10 mol % or lower, more preferably 5.00 mol % or lower and still more preferably 4.97 mol % or lower. When the content of the HFP unit is too high, formed articles obtained by forming the fluorine-containing copolymer are likely to deform when a load is applied continuously for a long term, and also become to have poor water vapor low permeability. When the content of the HFP unit is too low, formed articles obtained by forming the fluorine-containing copolymer become to have poor 80° C. abrasion resistance.

The content of the PPVE unit of the fluorine-containing copolymer is, with respect to the whole of the monomer units, 0.53 to 0.86 mol %, and preferably 0.54 mol % or higher, more preferably 0.57 mol % or higher, still more preferably 0.60 mol % or higher, especially preferably 0.63 mol % or higher and most preferably 0.66 mol % or higher, and preferably 0.84 mol % or lower, more preferably 0.82 mol % or lower, still more preferably 0.80 mol % or lower and especially preferably 0.78 mol % or lower. Due to that the content of the PPVE unit is in the above range, the fluorine-containing copolymer is unlikely to deform even in a melt state, and by forming such a fluorine-containing copolymer, thick sheets uniform in thickness can easily be obtained. Further, formed articles obtained by using such a fluorine-containing copolymer are unlikely to deform even when a load is applied continuously for a long term, and also become excellent in the 80° C. abrasion resistance, the water vapor low permeability and the durability to repeated loads. When the content of the PPVE unit is too low, formed articles obtained by forming the fluorine-containing copolymer become to have poor 80° C. abrasion resistance.

The content of the TFE unit of the fluorine-containing copolymer is, with respect to the whole of the monomer units, preferably 93.94 to 95.37 mol %, more preferably 94.06 mol % or higher, still more preferably 94.18 mol % or higher, further still more preferably 94.23 mol % or higher and especially preferably 94.25 mol % or higher, and more preferably 95.32 mol % or lower, still more preferably 95.20 mol % or lower, further still more preferably 95.07 mol % or lower and especially preferably 94.99 mol % or lower. The content of the TFE unit may be selected so that there becomes 100 mol %, the total of contents of the HFP unit, the PPVE unit, the TFE unit and other monomer units.

The fluorine-containing copolymer of the present disclosure is not limited as long as the copolymer contains the above three monomer units, and may be a copolymer containing only the above three monomer units, or may be a copolymer containing the above three monomer units and other monomer units.

The other monomers are not limited as long as being copolymerizable with TFE, HFP and PPVE, and may be fluoromonomers or fluorine-non-containing monomers.

It is preferable that the fluoromonomer is at least one selected from the group consisting of chlorotrifluoroethylene, vinyl fluoride, vinylidene fluoride, trifluoroethylene, hexafluoroisobutylene, monomers represented by $CH_2{=}CZ^1(CF_2)_nZ^2$ (wherein $Z^1$ is H or F, $Z^2$ is H, F or Cl, and n is an integer of 1 to 10), perfluoro(alkyl vinyl ether)s [PAVE] represented by $CF_2{=}CF{—}ORf^1$ (wherein $Rf^1$ is a perfluoroalkyl group having 1 to 8 carbon atoms) (here, excluding PPVE), alkyl perfluorovinyl ether derivatives represented by $CF_2{=}CF{—}O{—}CH_2{—}Rf^2$ (wherein $Rf^2$ is a perfluoroalkyl group having 1 to 5 carbon atoms), perfluoro-2,2-dimethyl-1,3-dioxol [PDD], and perfluoro-2-methylene-4-methyl-1,3-dioxolane [PMD].

The monomers represented by $CH_2{=}CZ^1(CF_2)_nZ^2$ include $CH_2{=}CFCF_3$, $CH_2{=}CH{—}C_4F_9$, $CH_2{=}CH{—}C_6F_{13}$, and $CH_2{=}CF{—}C_3F_6H$.

The perfluoro(alkyl vinyl ether)s represented by $CF_2{=}CF{—}ORf^1$ include $CF_2{=}CF{—}OCF_3$ and $CF_2{=}CF{—}OCF_2CF_3$.

The fluorine-non-containing monomers include hydrocarbon-based monomers copolymerizable with TFE, HFP and PPVE. Examples of the hydrocarbon-based monomers include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, n-vinyl butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-non-containing monomers may also be functional group-containing hydrocarbon-based monomers copolymerizable with TFE, HFP and PPVE. Examples of the functional group-containing hydrocarbon-based monomers include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-non-containing monomers having a glycidyl group, such as glycidyl vinyl ether and glycidyl allyl ether; fluorine-non-containing monomers having an amino group, such as aminoalkyl vinyl ethers and aminoalkyl allyl ethers; fluorine-non-containing monomers having an amido group, such as (meth)acrylamide and methylolacrylamide; bromine-containing olefins, iodine-containing olefins, bromine-containing vinyl ethers, and iodine-containing vinyl ethers; and fluorine-non-containing monomers having a nitrile group.

The content of the other monomer units in the fluorine-containing copolymer of the present disclosure is, with respect to the whole of the monomer units, preferably 0 to 1.43 mol %, and more preferably 1.0 mol % or lower, still more preferably 0.5 mol % or lower and especially preferably 0.1 mol % or lower.

The melt flow rate (MFR) of the fluorine-containing copolymer is 0.7 to 2.5 g/10 min, preferably 0.8 g/10 min or higher, more preferably 0.9 g/10 min or higher and still more preferably 1.0 g/10 min or higher, and preferably 2.4 g/10 min or lower, more preferably 2.3 g/10 min or higher, still more preferably 2.2 g/10 min or lower, especially preferably 2.1 g/10 min or lower and most preferably 2.0 g/10 min or lower. Due to that the MFR of the fluorine-containing copolymer is in the above range, the fluorine-containing copolymer becomes unlikely to deform even in a melt state, and by using such a fluorine-containing copolymer, thick sheets uniform in thickness can easily be obtained. Further, by using the fluorine-containing copolymer whose MFR is in the above range, there can be obtained formed articles also excellent in the 80° C. abrasion resistance, the water vapor low permeability and the durability to repeated loads. When the MFR is too low, formed articles excellent in the water vapor low permeability cannot be obtained. Further, due to that the MFR is in the above range, the own weight deformation in a melt state becomes extremely small.

In the present disclosure, the MFR is a value obtained as a mass (g/10 min) of a polymer flowing out from a die of 2 mm in inner diameter and 8 mm in length per 10 min at 372° C. under a load of 5 kg using a melt indexer G-01 (manufactured by Toyo Seiki Seisaku-sho Ltd.), according to ASTM D1238.

The MFR can be regulated by regulating the kind and amount of a polymerization initiator to be used in polymerization of monomers, the kind and amount of a chain transfer agent, and the like.

The fluorine-containing copolymer of the present disclosure may or may not have functional groups. The functional groups are ones present on main chain terminals or side chain terminals of the fluorine-containing copolymer, and ones present in the main chain or the side chains. Typical functional groups are —$CF=CF_2$, —$CF_2H$, —COF, —COOH, —$COOCH_3$, —$CONH_2$ and —$CH_2OH$.

The number of functional groups per $10^6$ main-chain carbon atoms of the fluorine-containing copolymer is preferably 50 or less, more preferably 40 or less, still more preferably 30 or less, especially preferably 20 or less and most preferably less than 15. Due to that the number of functional groups of the fluorine-containing copolymer is in the above range, there can be obtained formed articles hardly making fluorine ions to dissolve out in the chemical solution such as a hydrogen peroxide aqueous solution.

The number of functional groups of the fluorine-containing copolymer is the total number of —$CF=CF_2$, —$CF_2H$, —COF, —COOH, —$COOCH_3$, —$CONH_2$ and —$CH_2OH$.

The number of —$CF_2H$ per $10^6$ main-chain carbon atoms of the fluorine-containing copolymer is preferably 30 or less, more preferably 20 or less and still more preferably 10 or less.

The total number of —COOH, —$COOCH_3$, —$CH_2OH$, —COF, —$CF=CF_2$ and —$CONH_2$ per $10^6$ main-chain carbon atoms of the fluorine-containing copolymer is preferably 40 or less, more preferably 30 or less, still more preferably 20 or less and especially preferably less than 15.

For identification of the kind of the functional groups and measurement of the number of the functional groups, infrared spectroscopy can be used.

The number of the functional groups is measured, specifically, by the following method. First, the fluorine-containing copolymer is molded by cold press to prepare a film of 0.25 to 0.30 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the fluorine-containing copolymer is calculated according to the following formula (A).

$$N=I\times K/t \tag{A}$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF=CF_2$ | 1795 | 635 | 366 | $CF_2=CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of the functional group —COF is the total of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The number of —$CF_2H$ groups can also be determined from a peak integrated value of the —$CF_2H$ group acquired in a $^{19}F$-NMR measurement using a nuclear magnetic resonance spectrometer and set at a measurement temperature of (the melting point of a polymer+20) ° C.

Functional groups are functional groups present on the main chain terminals or side chain terminals of the fluorine-containing copolymer, and functional groups present on the main chain or the side chains thereof. The number of functional groups may be the total number of —$CF=CF_2$, —$CF_2H$, —COF, —COOH, —$COOCH_3$, —$CONH_2$ and —$CH_2OH$.

The functional groups are introduced to the fluorine-containing copolymer, for example, by a chain transfer agent or a polymerization initiator used in production of the fluorine-containing copolymer. For example, in the case of using an alcohol as the chain transfer agent, or a peroxide having a structure of —$CH_2OH$ as the polymerization initiator, —$CH_2OH$ is introduced on the main chain terminals of the fluorine-containing copolymer. Alternatively, the functional group is introduced on the side chain terminal of the fluorine-containing copolymer by polymerizing a monomer having the functional group.

By carrying out a treatment such as a wet heat treatment or a fluorination treatment on the fluorine-containing copolymer having such functional groups, there can be obtained the fluorine-containing copolymer having the number of functional groups in the above range. The fluorine-containing copolymer of the present disclosure is preferably one having been subjected to the wet heat treatment or the fluorination treatment and more preferably one having been subjected to the fluorination treatment. It is also preferable that the fluorine-containing copolymer of the present disclosure has —$CF_3$ terminal groups.

The melting point of the fluorine-containing copolymer is preferably 255 to 285° C. and more preferably 263 to 277° C. Due to that the melting point is in the above range, the fluorine-containing copolymer becomes further unlikely to deform even in a melt state. Further, by forming the fluorine-containing copolymer whose melting point is in the above range, there can more easily be obtained thick sheets uniform in thickness, and there can be obtained formed articles which are further unlikely to deform even when a load is applied continuously for a long term and are further excellent in the 80° C. abrasion resistance, the water vapor low permeability and the durability to repeated loads.

In the present disclosure, the melting point can be measured by using a differential scanning calorimeter [DSC].

The water vapor permeability of the fluorine-containing copolymer of the present disclosure is preferably 13.5 g·cm/$m^2$ or lower and more preferably 13.0 g·cm/$m^2$ or lower. Due to that the water vapor permeability is in the above range, when the fluorine-containing copolymer of the present disclosure is used to obtain formed articles such as sheets, tubes, piping, joints, flowmeter bodies, bottles and nuts, the permeation of moisture such as water vapor in the outside air to the inside of the formed articles can be sufficiently suppressed. Further, when the fluorine-containing copolymer of the present disclosure is used to obtain formed articles such as gaskets and packings and they are applied to non-aqueous electrolyte batteries, the permeation of water vapor from the outside into the non-aqueous electrolyte batteries can be suppressed, and the deterioration of the battery performance and the shortening of the service life of the non-aqueous electrolyte batteries can be suppressed.

In the fluorine-containing copolymer of the present disclosure, the amount of fluorine ions dissolving out therefrom detected by an immersion test in a hydrogen peroxide aqueous solution is, in terms of mass, preferably 4.0 ppm or lower, more preferably 3.0 ppm or lower and still more preferably 2.8 ppm or lower. Due to that the amount of fluorine ions dissolving out is in the above range, when the fluorine-containing copolymer of the present disclosure is used to obtain formed articles and they are used for piping members used to transfer chemical solutions, flowmeter bodies equipped with flow channels for chemical solutions in flowmeters, and sealing members in contact with chemical solutions, the dissolution of fluorine ions out into the chemical solutions can be suppressed.

In the present disclosure, the immersion test in a hydrogen peroxide aqueous solution can be carried out by using the fluorine-containing copolymer and preparing a test piece having a weight corresponding to that of 10 sheets of a formed article (15 mm×15 mm×0.2 mm), and putting, in a thermostatic chamber of 95° C., a polypropylene-made bottle in which the test piece and 15 g of a 3-mass % hydrogen peroxide aqueous solution are put and allowing the resultant to stand for 20 hours.

The fluorine-containing copolymer of the present disclosure can be produced by any polymerization method of bulk polymerization, solution polymerization, suspension polymerization, emulsion polymerization and the like. In these polymerization methods, conditions such as temperature and pressure, a polymerization initiator, a chain transfer agent, a solvent and other additives can suitably be set depending on the composition and the amount of a desired fluorine-containing copolymer.

The polymerization initiator may be an oil-soluble radical polymerization initiator or a water-soluble radical initiator.

An oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl] peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrododecafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a well known water-soluble peroxide, and examples thereof include ammonium salts, potassium salts and sodium salts of persulfuric acid, perboric acid, perchloric acid, perphosphoric acid, percarbonic acid and the like, and t-butyl permaleate and t-butyl hydroperoxide. A reductant such as a sulfite salt may be combined with a peroxide and used, and the amount thereof to be used may be 0.1 to 20 times with respect to the peroxide.

Examples of the chain transfer agent include hydrocarbons such as ethane, isopentane, n-hexane and cyclohexane; aromatics such as toluene and xylene; ketones such as acetone; acetates such as ethyl acetate and butyl acetate; alcohols such as methanol, ethanol and 2,2,2-trifluoroethanol; mercaptans such as methyl mercaptan; halogenated hydrocarbons such as carbon tetrachloride, chloroform, methylene chloride and methyl chloride; and 3-fluorobenzotrifluoride. The amount thereof to be added can vary depending on the magnitude of the chain transfer constant of a compound to be used, but the chain transfer agent is used usually in the range of 0.01 to 20 parts by mass with respect to 100 parts by mass of a solvent.

For example, in the cases of using a dialkyl peroxycarbonate, a di[fluoro(or fluorochloro)acyl] peroxide or the like as a polymerization initiator, although there are some cases where the molecular weight of an obtained fluorine-containing copolymer becomes too high and the regulation of the melt flow rate to a desired one is not easy, the molecular weight can be regulated by using the chain transfer agent. It is especially suitable that the fluorine-containing copolymer is produced by suspension polymerization using the chain transfer agent such as an alcohol and the oil-soluble radical polymerization initiator.

The solvent includes water and mixed solvents of water and an alcohol. A monomer to be used for the polymerization of the fluorine-containing copolymer of the present disclosure can also be used as the solvent.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100 parts by mass with respect to 100 parts by mass of the solvent.

The polymerization temperature is not limited, and may be 0 to 100° C. In the case where the decomposition rate of the polymerization initiator is too high, including cases of using a dialkyl peroxycarbonate, a di[fluoro(or fluorochloro) acyl] peroxide or the like as the polymerization initiator, it is preferable to adopt a relatively low polymerization temperature such as in the temperature range of 0 to 35° C.

The polymerization pressure can suitably be determined according to other polymerization conditions such as the kind of the solvent to be used, the amount of the solvent, the vapor pressure and the polymerization temperature, but usually may be 0 to 9.8 MPaG. The polymerization pressure is preferably 0.1 to 5 MPaG, more preferably 0.5 to 2 MPaG and still more preferably 0.5 to 1.5 MPaG. When the polymerization pressure is 1.5 MPaG or higher, the production efficiency can be improved.

Examples of the additives in the polymerization include suspension stabilizers. The suspension stabilizers are not limited as long as being conventionally well-known ones, and methylcellulose, polyvinyl alcohols and the like can be used. With the use of a suspension stabilizer, suspended particles produced by the polymerization reaction are dispersed stably in an aqueous medium, and therefore the suspended particles hardly adhere on the reaction vessel even when a SUS-made reaction vessel not having been subjected to adhesion preventing treatment such as glass lining is used. Accordingly, a reaction vessel withstanding a high pressure can be used, and therefore the polymerization under a high pressure becomes possible and the production efficiency can be improved. By contrast, in the case of carrying out the polymerization without using the suspension stabilizer, the suspended particles may adhere and the production efficiency may be lowered with the use of a SUS-made reaction vessel not having been subjected to adhesion preventing treatment is used. The concentration of the suspension stabilizer in the aqueous medium can suitably be regulated depending on conditions.

In the case of obtaining an aqueous dispersion containing a fluoropolymer by a polymerization reaction, a dried fluoropolymer may be recovered by coagulating, cleaning and drying the fluorine-containing copolymer contained in the aqueous dispersion. Alternatively, in the case of obtaining the fluorine-containing copolymer as a slurry by a polymerization reaction, a dried fluoropolymer may be recovered by taking out the slurry from a reaction vessel, and cleaning and drying the slurry. The fluorine-containing copolymer can be recovered in a powder form by the drying.

The fluorine-containing copolymer obtained by the polymerization may be formed into pellets. A method of forming into pellets is not limited, and a conventionally known method can be used. Examples thereof include methods of melt extruding the fluorine-containing copolymer by using a single-screw extruder, a twin-screw extruder or a tandem extruder and cutting the resultant into a predetermined length to form the fluorine-containing copolymer into pellets. The extrusion temperature in the melt extrusion needs to be varied depending on the melt viscosity and the production method of the fluorine-containing copolymer, and is preferably the melting point of the fluorine-containing copolymer+20° C. to the melting point of the fluorine-containing copolymer+140° C. A method of cutting the fluorine-containing copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

The fluorine-containing copolymer obtained by the polymerization may be heated in the presence of air and water at a temperature of 100° C. or higher (wet heat treatment). Examples of the wet heat treatment include a method in which by using an extruder, the fluorine-containing copolymer obtained by the polymerization is melted and extruded while air and water are fed. The wet heat treatment can convert thermally unstable functional groups of the fluorine-containing copolymer, such as —COF and —COOH, to thermally relatively stable $—CF_2H$, whereby the total number of —COF and —COOH and the total number of —COOH, $—COOCH_3$, $—CH_2OH$, —COF, $—CF{=}CF_2$, and $—CONH_2$ of the fluorine-containing copolymer can easily be regulated in the above-mentioned ranges. By heating the fluorine-containing copolymer, in addition to air and water, in the presence of an alkali metal salt, the conversion reaction to $—CF_2H$ can be promoted. Depending on applications of the fluorine-containing copolymer, however, it should be paid regard to that contamination by the alkali metal salt must be avoided.

The fluorine-containing copolymer obtained by the polymerization may be subjected to a fluorination treatment. The fluorination treatment can be carried out by bringing the fluorine-containing copolymer subjected to no fluorination treatment into contact with a fluorine-containing compound. The fluorination treatment can convert thermally unstable functional groups of the fluorine-containing copolymer, such as —COOH, $—COOCH_3$, $—CH_2OH$, —COF, $—CF{=}CF_2$, and $—CONH_2$, and thermally relatively stable functional groups thereof, such as $—CF_2H$, to thermally very stable —CF 3. Resultantly, the total number of COOH, $—COOCH_3$, $—CH_2OH$, —COF, $—CF{=}CF_2$, and $—CONH_2$ of the fluorine-containing copolymer can easily be regulated in the above-mentioned ranges.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the fluorine-containing copolymer in a melted state may be brought into contact with the fluorine-containing compound, but the fluorination treatment can be carried out usually at a temperature of not higher than the melting point of the fluorine-containing copolymer, preferably at 20 to 220° C. and more preferably at 100 to 200° C. The fluorination treatment is carried out usually for 1 to 30 hours and preferably 5 to 25 hours. The fluorination treatment is preferred which brings the fluorine-containing copolymer having been subjected to no fluorination treatment into contact with fluorine gas ($F_2$ gas).

A composition may be obtained by mixing the fluorine-containing copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

Then, the other components may be other polymers other than the above-mentioned fluorine-containing copolymer. The other polymers include fluororesins other than the above fluorine-containing copolymer, fluoroelastomers and non-fluorinated polymers.

A method of producing the above composition includes a method in which the fluorine-containing copolymer and other components are dry mixed, and a method in which the fluorine-containing copolymer and other components are previously mixed by a mixer, and then, melt kneaded by a kneader, a melt extruder or the like.

The fluorine-containing copolymer of the present disclosure or the above-mentioned composition can be used as a processing aid, a forming material or the like, but it is suitable to use that as a forming material. Then, aqueous dispersions, solutions and suspensions of the fluorine-containing copolymer of the present disclosure, and the copolymer/solvent-based materials can also be utilized; and these can be used for application of coating materials, encapsulation, impregnation, and casting of films. However, since the fluorine-containing copolymer of the present disclosure has the above-mentioned properties, it is preferable to use the copolymer as the forming material.

Formed articles may be obtained by forming the fluorine-containing copolymer of the present disclosure or the above-mentioned composition.

A method of forming the fluorine-containing copolymer or the composition is not limited, and includes injection molding, extrusion forming, compression molding, blow molding, transfer molding, rotomolding and rotolining molding. As the forming method, among these, preferable are extrusion forming, compression molding, and transfer molding; from the viewpoint of being able to produce forming articles in a high productivity, more preferable are extrusion forming and transfer molding, and still more preferable is extrusion forming. That is, it is preferable that formed articles are extrusion formed articles, compression molded articles, injection molded articles or transfer molded articles; and from the viewpoint of being able to produce molded articles in a high productivity, being extrusion formed articles or transfer molded articles is more preferable, and being extrusion formed articles is still more preferable. Beautiful formed articles can be obtained by molding the fluorine-containing copolymer of the present disclosure by an extrusion forming or transfer molding.

Formed articles containing the fluorine-containing copolymer of the present disclosure may be, for example, nuts, bolts, joints, films, bottles, gaskets, electric wire coatings, tubes, hoses, pipes, valves, sheets, seals, packings, tanks, rollers, containers, cocks, connectors, filter housings, filter cages, flowmeters, pumps, wafer carriers, and wafer boxes.

The fluorine-containing copolymer of the present disclosure, the above composition and the above formed articles can be used, for example, in the following applications.

Food packaging films, and members for liquid transfer for food production apparatuses, such as lining materials of fluid transfer lines, packings, sealing materials and sheets, used in food production processes;

- chemical stoppers and packaging films for chemicals, and members for chemical solution transfer, such as lining materials of liquid transfer lines, packings, sealing materials and sheets, used in chemical production processes; inner surface lining materials of chemical solution tanks and piping of chemical plants and semiconductor factories; members for fuel transfer, such as O (square) rings, tubes, packings, valve stem materials, hoses and sealing materials, used in fuel systems and peripheral equipment of automobiles, and such as hoses and sealing materials, used in ATs of automobiles;
- members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;
- members for chemical transfer for semiconductor apparatuses, such as O (square) rings, tubes, packings, valve stem materials, hoses, sealing materials, rolls, gaskets, diaphragms and joints for semiconductor production apparatuses;
- members for coating and inks, such as coating rolls, hoses and tubes, for coating facilities, and containers for inks; members for food and beverage transfer, such as tubes, hoses, belts, packings and joints for food and beverage, food packaging materials, and members for glass cooking appliances; members for waste liquid transport, such as tubes and hoses for waste liquid transport;
- members for high-temperature liquid transport, such as tubes and hoses for high-temperature liquid transport;
- members for steam piping, such as tubes and hoses for steam piping;
- corrosionproof tapes for piping, such as tapes wound on piping of decks and the like of ships;
- various coating materials, such as electric wire coating materials, optical fiber coating materials, and transparent front side coating materials installed on the light incident side and back side lining materials of photoelectromotive elements of solar cells;
- diaphragms and sliding members such as various types of packings of diaphragm pumps;
- films for agriculture, and weathering covers for various kinds of roof materials, sidewalls and the like;
- interior materials used in the building field, and coating materials for glasses such as non-flammable fireproof safety glasses; and
- lining materials for laminate steel sheets used in the household electric field.

The fuel transfer members used in fuel systems of automobiles further include fuel hoses, filler hoses and evap hoses. The above fuel transfer members can also be used as fuel transfer members for gasoline additive-containing fuels, resistance to sour gasoline, resistance to alcohols, and resistance to methyl tertiary butyl ether and amines and the like.

The above chemical stoppers and packaging films for chemicals have excellent chemical resistance to acids and the like. The above chemical solution transfer members also include corrosionproof tapes wound on chemical plant pipes.

The above formed articles also include vehicular radiator tanks, chemical solution tanks, bellows, spacers, rollers and gasoline tanks, waste liquid transport containers, high-temperature liquid transport containers and fishery and fish farming tanks.

The above formed articles further include members used for vehicular bumpers, door trims and instrument panels, food processing apparatuses, cooking devices, water- and oil-repellent glasses, illumination-related apparatuses, display boards and housings of OA devices, electrically illuminated billboards, displays, liquid crystal displays, cell phones, printed circuit boards, electric and electronic components, sundry goods, dust bins, bathtubs, unit baths, ventilating fans, illumination frames and the like.

Since formed articles containing the fluorine-containing copolymer of the present disclosure are unlikely to deform even when a load is applied continuously for a long term, and are also excellent in the 80° C. abrasion resistance, the water vapor low permeability and the durability to repeated loads, the formed articles can suitably be utilized for nuts, bolts, joints, packings, valves, cocks, connectors, filter housings, filter cages, flowmeters, pumps and the like. Among these, they can suitably be utilized for piping members (especially valves and joints) used to transfer chemical solutions, and as flowmeter bodies equipped with flow channels for chemical solutions in flowmeters. The piping member and the flowmeter body of the present disclosure are unlikely to deform even when a load is applied continuously for a long term, and are also excellent in the 80° C. abrasion resistance, the water vapor low permeability and the durability to repeated loads. Therefore, the piping member and the flowmeter body of the present disclosure are unlikely to be damaged even when a stress is repeatedly applied in response to a start of distribution, a stop of distribution, and a change in flow rate of the chemical solution.

Since formed articles containing the fluorine-containing copolymer of the present disclosure are excellent in the sealability and are also excellent in the 80° C. abrasion resistance, the water vapor low permeability and the durability to repeated loads, the formed articles can suitably be utilized for members to be compressed such as gaskets and packings. The member to be compressed of the present disclosure may be a gasket or a packing. The gasket or the packing of the present disclosure is excellent in the sealability and is also excellent in the 80° C. abrasion resistance, the water vapor low permeability and the durability to repeated loads. Since the member to be compressed of the present disclosure is excellent in the water vapor low permeability and the sealability, the member can suitably be used as piping members for transferring chemical solutions for which contamination of moisture such as water vapor in the outside air is not desirable.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptic shape, a corner-rounded square or the like, and may be a shape having a throughhole in the central portion thereof.

It is preferable that the members to be compressed of the present disclosure are used as members constituting non-aqueous electrolyte batteries. Since the member to be compressed of the present disclosure is excellent in the sealability and is also excellent in the 80° C. abrasion resistance, the water vapor low permeability and the durability to repeated loads, the member is especially suitable as members to be used in a state of contacting with a non-aqueous electrolyte in non-aqueous electrolyte batteries. That is, the member to be compressed of the present disclosure may also be one having a liquid-contact surface with a non-aqueous electrolyte in non-aqueous electrolyte batteries.

The member to be compressed of the present disclosure hardly make water vapor to permeate. Therefore, by using the member to be compressed of the present disclosure, the permeation of water vapor from the outside to secondary batteries can be suppressed. Consequently, by using the member to be compressed of the present disclosure, the deterioration of the battery performance and the shortening of the service life of non-aqueous electrolyte batteries can be suppressed.

The water vapor permeability of the member to be compressed of the present disclosure is, from the viewpoint that the deterioration of the battery performance and the shortening of the service life of non-aqueous electrolyte batteries can be further suppressed, preferably 13.5 $g \cdot cm/m^2$ or lower and more preferably 13.0 $g \cdot cm/m^2$ or lower. The water vapor permeability of the member to be compressed can be measured under the condition of a temperature of 95° C. and for 30 days.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

For the non-aqueous electrolyte, one or two or more of well-known solvents can be used such as propylene carbonate, ethylene carbonate, butylene carbonate, γ-butylolactone, 1,2-dimethoxyethane, 1,2-diethoxyethane, dimethyl carbonate, diethyl carbonate and ethyl methyl carbonate. The non-aqueous electrolyte batteries may further have an electrolyte. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

The members to be compressed of the present disclosure can suitably be utilized, for example, as sealing members such as sealing gaskets and sealing packings, and insulating members such as insulating gaskets and insulating packings. The sealing members are members to be used for preventing leakage of a liquid or a gas, or penetration of a liquid or a gas from the outside. The insulating members are members to be used for insulating electricity. The members to be compressed of the present disclosure may also be members to be used for the purpose of both of sealing and insulation.

Since the member to be compressed of the present disclosure is excellent in the sealability and is also excellent in the 80° C. abrasion resistance, the water vapor low permeability and the durability to repeated loads, the member can suitably be used as sealing members for non-aqueous electrolyte batteries or insulating members for non-aqueous electrolyte batteries. Further, the members to be compressed of the present disclosure, due to containing the above fluorine-containing copolymer, have the excellent insulating property. Therefore, in the case of using the members to be compressed of the present disclosure as insulating members, the member firmly adhere to two or more electrically conductive members and prevent short circuit over a long term.

The fluorine-containing copolymer of the present disclosure can suitably be utilized as a material for forming electric wire coatings.

The coated electric wire has a core wire, and the coating layer installed on the periphery of the core wire and containing the fluorine-containing copolymer of the present disclosure. For example, an extrusion formed article made by melt extruding the fluorine-containing copolymer in the present disclosure on a core wire can be made into the coating layer. The coated electric wires are suitable for LAN cables (Ethernet Cables), high-frequency transmission cables, flat cables and heat-resistant cables and the like, and particularly, for transmission cables such as LAN cables (Ethernet Cables) and high-frequency transmission cables.

As a material for the core wire, for example, a metal conductor material such as copper or aluminum can be used. The core wire is preferably one having a diameter of 0.02 to 3 mm. The diameter of the core wire is more preferably 0.04 mm or larger, still more preferably 0.05 mm or larger and especially preferably 0.1 mm or larger. The diameter of the core wire is more preferably 2 mm or smaller.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. It is also preferable that the thickness of the coating layer is 2.0 mm or smaller.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the fluorine-containing copolymer of the present disclosure can suitably be utilized as the insulating coating layer containing the fluorine-containing copolymer. The thickness of each layer in the above structure is not limited, but is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

The average cell size of the cells is not limited, but is, for example, preferably 60 μm or smaller, more preferably 45 μm or smaller, still more preferably 35 μm or smaller, further still more preferably 30 μm or smaller, especially preferably 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell by way of the image processing and averaging the diameters.

The foaming ratio of the coating layer may be 20% or higher, and is more preferably 30% or higher, still more preferably 33% or higher and further still more preferably 35% or higher. The upper limit is not limited, but is, for example, 80%. The upper limit of the foaming ratio may be 60%. The foaming ratio is a value determined as ((the specific gravity of an electric wire coating material−the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the fluorine-containing copolymer, extruding the fluorine-containing copolymer in a melt state on the core wire to thereby form the coating layer.

In formation of a coating layer, by heating the fluorine-containing copolymer and introducing a gas in the fluorine-containing copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas in the heated fluorine-containing copolymer, or may be generated by mingling a chemical foaming agent in the fluorine-containing copolymer. The gas dissolves in the fluorine-containing copolymer in a melt state.

Then, the fluorine-containing copolymer of the present disclosure can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed circuit boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the fluorine-containing copolymer of the present disclosure can suitably be used as insulators in that the dielectric loss tangent is low.

As the (1) formed boards, printed wiring boards are preferable in that the good electric property is provided. The printed wiring boards are not limited, but examples thereof include printed wiring boards of electronic circuits for cell phones, various computers, communication devices and the like. As the (2) formed articles, antenna covers are preferable in that the dielectric loss is low.

Since the fluorine-containing copolymer of the present disclosure is unlikely to deform even in a melt state and can easily give thick sheets uniform in thickness, and further, formed articles obtained therefrom are unlikely to deform even when a load is applied continuously for a long term and are also excellent in the 80° C. abrasion resistance, the water vapor low permeability and the durability to repeated loads, the fluorine-containing copolymer can suitably be utilized for films or sheets.

The films of the present disclosure are useful as release films. The release films can be produced by forming the fluorine-containing copolymer of the present disclosure by melt extrusion, calendering, press molding, casting or the like. From the viewpoint that uniform thin films can be obtained, the release films can be produced by melt extrusion.

The films of the present disclosure can be applied to roll surfaces used in OA devices. Then, the fluorine-containing copolymer of the present disclosure is formed into needed shapes by extrusion forming, compression molding, press molding or the like to be formed into sheet-shapes, filmy shapes or tubular shapes, and can be used as surface materials for OA device rolls, OA device belts or the like. Thick sheets and large pipes can be produced particularly by a melt extrusion forming method.

Since the fluorine-containing copolymer of the present disclosure is unlikely to deform even in a melt state, it can easily be formed into beautiful thick pipes by an extrusion forming method. Further, formed articles obtained therefrom are unlikely to deform even when a load is applied continuously for a long term, and are also excellent in the 80° C. abrasion resistance, the water vapor low permeability and the durability to repeated loads. Accordingly, the fluorine-containing copolymer of the present disclosure can suitably be utilized for tubes or pipes. Pipes containing the fluorine-containing copolymer of the present disclosure can not only be produced in a high productivity even when the diameter is large or even when the thickness is large, but also have beautiful shapes, are unlikely to deform even when a load is applied continuously for a long term, and are also excellent in the 80° C. abrasion resistance, the water vapor low permeability and the durability to repeated loads.

So far, embodiments have been described, but it is to be understood that various changes and modifications of patterns and details may be made without departing from the subject matter and the scope of the claims.

According to the present disclosure, there is provided a fluorine-containing copolymer comprising tetrafluoroethylene unit, hexafluoropropylene unit and perfluoro(propyl vinyl ether) unit, wherein the copolymer has a content of hexafluoropropylene unit of 4.10 to 20 mol % with respect to the whole of the monomer units, a content of perfluoro (propyl vinyl ether) unit of 0.53 to 0.86 mol % with respect to the whole of the monomer units and a melt flow rate at 372° C. of 0.7 to 2.5 g/10 min.

It is preferable that the content of hexafluoropropylene unit is 4.35 to 4.97 mol % with respect to the whole of the monomer units.

It is preferable that the content of perfluoro(propyl vinyl ether) unit is 0.66 to 0.7 mol % with respect to the whole of the monomer units.

It is preferable that the melt flow rate at 372° C. is 0.7 to 2.0 g/10 min.

It is preferable that the number of functional groups is 50 or less per $10^6$ main-chain carbon atoms.

Then, according to the present disclosure, there is provided an extrusion formed article or a transfer molded article, comprising the above fluorine-containing copolymer.

Further, according to the present disclosure, there is provided a coated electric wire comprising a coating layer comprising the above fluorine-containing copolymer.

Further, according to the present disclosure, there is provided a formed article comprising the above fluorine-containing copolymer, wherein the formed article is a sheet or a pipe.

EXAMPLES

The embodiments of the present disclosure will be described by Examples as follows, but the present disclosure is not limited only to these Examples.

Each numerical value in Examples was measured by the following methods.

(Contents of Monomer Units)

The content of each monomer unit of the fluorine-containing copolymer was measured by an NMR analyzer (for example, manufactured by Bruker BioSpin GmbH, AVANCE 300, high-temperature probe), or an infrared absorption spectrometer (manufactured by PerkinElmer, Inc., Spectrum One).

(The Number of —$CF_2H$)

The number of —$CF_2H$ groups of the fluorine-containing copolymer was determined from a peak integrated value of the —$CF_2H$ group acquired in a $^{19}F$-NMR measurement using a nuclear magnetic resonance spectrometer AVANCE-300 (manufactured by Bruker BioSpin GmbH) and set at a measurement temperature of (the melting point of the polymer+20) ° C.

(The Numbers of —COOH, —$COOCH_3$, —$CH_2OH$, —COF, —$CF{=}CF_2$ and —$CONH_2$)

A dried powder or pellets obtained in each of Examples and Comparative Examples were molded by cold press to prepare a film of 0.25 to 0.3 mm in thickness. The film was 40 times scanned by a Fourier transform infrared spectrometer [FT-IR (Spectrum One, manufactured by PerkinElmer, Inc.)] and analyzed to obtain an infrared absorption spectrum. The obtained infrared absorption spectrum was compared with an infrared absorption spectrum of an already known film to determine the kinds of terminal groups. Further, from an absorption peak of a specific functional group emerging in a difference spectrum between the obtained infrared absorption spectrum and the infrared absorption spectrum of the already known film, the number N of the functional group per $1\times10^6$ carbon atoms in the sample was calculated according to the following formula (A).

$$N=I\times K/t \quad (A)$$

I: absorbance

K: correction factor t: thickness of film (mm)

Regarding the functional groups in Examples, for reference, the absorption frequency, the molar absorption coefficient and the correction factor are shown in Table 2. Further, the molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |

TABLE 2-continued

| Functional Group | Absorption Frequency ($cm^{-1}$) | Molar Extinction Coefficient (l/cm/mol) | Correction Factor | Model Compound |
|---|---|---|---|---|
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF{=}CF_2$ | 1795 | 635 | 366 | $CF_2{=}CF_2$ |

(Melt Flow Rate (MFR))

The MFR of the fluorine-containing copolymer was determined by using a Melt Indexer G-01 (manufactured by Toyo Seiki Seisaku-sho, Ltd.), and making the polymer to flow out from a die of 2 mm in inner diameter and 8 mm in length at 372° C. under a load of 5 kg and measuring the mass (g/10 min) of the polymer flowing out per 10 min, according to ASTM D-1238.

(Melting Point)

The fluorine-containing copolymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point of the fluorine-containing copolymer was determined from a melting curve peak observed in the second temperature raising step.

Example 1

40.25 kg of deionized water and 0.291 kg of methanol were fed in a 174 L-volume autoclave with a stirrer, and the autoclave inside was sufficiently vacuumized and replaced with nitrogen. Thereafter, the autoclave inside was vacuum deaerated, and in the autoclave put in a vacuum state, 40.25 kg of HFP and 1.19 kg of PPVE were fed; and the autoclave was heated to 25.5° C. Then, TFE was fed until the internal pressure of the autoclave became 0.924 MPa; and then, 1.25 kg of a 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.874 MPa, and by continuously adding TFE, the set pressure was made to be held. After 1.5 hours from the polymerization initiation, 0.291 kg of methanol was additionally fed. After 2 hours and 4 hours from the polymerization initiation, 1.25 kg of DHP was additionally fed, and the internal pressure was lowered by 0.002 MPa, respectively; after 6 hours therefrom, 0.96 kg thereof was fed and the internal pressure was lowered by 0.002 MPa. Hereafter, 0.25 kg of DHP was fed at every 2 hours until the reaction finished, and at the every time, the internal pressure was lowered by 0.002 MPa.

Then, at each time point when the amount of TFE continuously additionally fed reached 8.1 kg, 16.2 kg and 24.3 kg, 0.22 kg of PPVE was additionally fed. Then, at each time point when the amount of TFE additionally fed reached 6.0 kg and 18.1 kg, 0.291 kg of methanol was additionally fed in the autoclave. Then, when the amount of TFE additionally fed reached 40.25 kg, the polymerization was made to finish. After the finish of the polymerization, unreacted TFE and HFP were discharged to thereby obtain a wet powder. Then, the wet powder was washed with pure water, and thereafter dried at 150° C. for 10 hours to thereby obtain 44.3 kg of a dry powder.

The obtained powder was melt extruded at 370° C. by a screw extruder (trade name: PCM46, manufactured by Ikegai Corp.) to thereby obtain pellets of a copolymer. By using the obtained pellets, the above physical properties were measured by the methods described above. The results are shown in Table 3.

Example 2

Copolymer pellets were obtained as in Example 1, except for changing the amount of methanol fed before the polymerization initiation to 0.124 kg, changing the each amount of methanol dividedly additionally fed after the polymerization initiation to 0.124 kg, changing the amount of PPVE fed before the polymerization initiation to 1.06 kg, changing the each amount of PPVE dividedly additionally fed after the polymerization initiation to 0.21 kg, and changing the each set pressure in the autoclave inside before and after the polymerization initiation to 0.906 MPa. By using the obtained pellets, the content of HFP and the content of PPVE were measured by the methods described above. The results are shown in Table 3.

The obtained pellets were deaerated at 200° C. for 8 hours in an electric furnace, put in a vacuum vibration-type reactor VVD-30 (manufactured by Okawara Mfg. Co. Ltd.), and heated to 200° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 200° C. for 8 hours. After the reaction was finished, the reactor interior was replaced sufficiently by $N_2$ gas to finish the fluorination reaction, thereby obtaining pellets. By using the obtained pellets, the above physical properties were measured by the methods described above. The results are shown in Table 3.

Example 3

Copolymer pellets were obtained as in Example 1, except for changing the amount of methanol fed before the polymerization initiation to 0.030 kg, changing the each amount of methanol dividedly additionally fed after the polymerization initiation to 0.030 kg, changing the amount of PPVE fed before the polymerization initiation to 0.90 kg, changing the each amount of PPVE dividedly additionally fed after the polymerization initiation to 0.19 kg, and changing the each set pressure in the autoclave inside before and after the polymerization initiation to 0.892 MPa. By using the obtained pellets, the content of HFP and the content of PPVE were measured by the methods described above. The results are shown in Table 3.

The obtained pellets were fluorinated as in Example 2. By using the obtained pellets, the above physical properties were measured by the methods described above. The results are shown in Table 3.

Comparative Example 1

Copolymer pellets were obtained as in Example 1, except for changing the amount of methanol fed before the polymerization initiation to 0.327 kg, changing the each amount of methanol dividedly additionally fed after the polymerization initiation to 0.327 kg, changing the amount of PPVE fed before the polymerization initiation to 0.56 kg, changing the each amount of PPVE dividedly additionally fed after the polymerization initiation to 0.11 kg, and changing the each set pressure in the autoclave inside before and after the polymerization initiation to 0.906 MPa. By using obtained pellets, the above physical properties were measured by the methods described above. The results are shown in Table 3.

Comparative Example 2

Copolymer pellets were obtained as in Example 1, except for changing the amount of methanol fed before the polymerization initiation to 0.257 kg, changing the each amount of methanol dividedly additionally fed after the polymerization initiation to 0.257 kg, changing the amount of PPVE fed before the polymerization initiation to 1.12 kg, changing the each amount of PPVE dividedly additionally fed after the polymerization initiation to 0.23 kg, and changing the each set pressure in the autoclave inside before and after the polymerization initiation to 0.892 MPa. By using the obtained pellets, the above physical properties were measured by the methods described above. The results are shown in Table 3.

Comparative Example 3

Copolymer pellets were obtained as in Example 1, except for changing the amount of methanol fed before the polymerization initiation to 0.664 kg, changing the each amount of methanol dividedly additionally fed after the polymerization initiation to 0.664 kg, changing the amount of PPVE fed before the polymerization initiation to 1.35 kg, changing the each amount of PPVE dividedly additionally fed after the polymerization initiation to 0.17 kg, and changing the each set pressure in the autoclave inside before and after the polymerization initiation to 0.994 MPa. By using the obtained pellets, the above physical properties were measured by the methods described above. The results are shown in Table 3.

Comparative Example 4

Copolymer pellets were obtained as in Example 1, except for changing the amount of methanol fed before the polymerization initiation to 0.012 kg, changing the each amount of methanol dividedly additionally fed after the polymerization initiation to 0.012 kg, changing the amount of PPVE fed before the polymerization initiation to 0.93 kg, changing the each amount of PPVE dividedly additionally fed after the polymerization initiation to 0.22 kg, and changing the each set pressure in the autoclave inside before and after the polymerization initiation to 0.855 MPa. By using the obtained pellets, the above physical properties were measured by the methods described above. The results are shown in Table 3.

Comparative Example 5

945 g of deionized water was fed in a 4 L-volume autoclave with a stirrer, and the autoclave inside was sufficiently vacuumized and replaced with nitrogen. Thereafter, the autoclave inside was vacuum deaerated, and in the autoclave put in a vacuum state, 945 g of HFP and 25.0 g of PPVE were fed; and the autoclave was heated to 25.5° C. Then, TFE was fed until the internal pressure of the autoclave became 0.892 MPa; and then, 29.4 g of a 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.892 MPa, and by continuously adding TFE, the set pressure was made to be held. After 2 hours and 4 hours from the polymerization initiation, 29.4 g of DHP was additionally fed, and the internal pressure was lowered by 0.002 MPa, respectively; after 6 hours therefrom, 22.6 g thereof was fed and the internal pressure was lowered by 0.002 MPa. Hereafter, 1.1 g of DHP was additionally fed at every 2 hours until the reaction finished, and at the every time, the internal pressure was lowered by 0.002 MPa.

Then, at a time point when the amount of TFE continuously additionally fed reached 190 g, 5.2 g of PPVE was additionally fed. Then, when the amount of TFE additionally fed reached 380 g, the polymerization was made to finish. After the finish of the polymerization, unreacted TFE and HFP were discharged to thereby obtain a wet powder. Then, the wet powder was washed with pure water, and thereafter dried at 150° C. for 10 hours and then dried at 205° C. for 24 hours to thereby obtain 421 g of a dry powder. By using the obtained powder, the content of HFP and the content of PEVE were measured by the methods described above. The results are shown in Table 3.

The obtained powder was put in a portable reactor TVS1 type (manufactured by TAIATSU TECHNO CORPORATION) and heated to 200° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 200° C. for 8 hours. After the reaction was finished, the reactor interior was replaced sufficiently by $N_2$ gas to finish the fluorination reaction, thereby obtaining a powder. By using the obtained powder, the above physical properties were measured by the methods described above. The results are shown in Table 3.

TABLE 3

| | HFP content (mol %) | PPVE content (mol %) | Number of —$CF_2H$ (number/$C10^6$) | Number of functional groups N (number/$C10^6$) | MFR (g/10 min) | Melting point (° C.) |
|---|---|---|---|---|---|---|
| Example 1 | 4.35 | 0.78 | 157 | 30 | 2.0 | 272 |
| Example 2 | 4.70 | 0.74 | <9 | <6 | 1.0 | 270 |
| Example 3 | 4.97 | 0.66 | <9 | <6 | 0.7 | 268 |
| Comparative Example 1 | 4.67 | 0.39 | 192 | 21 | 2.5 | 277 |
| Comparative Example 2 | 4.98 | 0.82 | 217 | 32 | 3.3 | 266 |
| Comparative Example 3 | 2.38 | 0.58 | 176 | 23 | 2.2 | 293 |
| Comparative Example 4 | 5.91 | 0.78 | 69 | 33 | 1.0 | 259 |
| Comparative Example 5 | 4.98 | 0.78 | <9 | <6 | 0.2 | 266 |

The description of "<9" in Table 3 means that the number of —$CF_2H$ groups is less than 9. The description of "<6" in Table 3 means that the total number of —COOH, —$COOCH_3$, —$CH_2OH$, —COF, —CF=$CF_2$ and —$CONH_2$ (number of functional groups N) is less than 6.

Then, by using the obtained pellets, the following properties were evaluated. The results are shown in Table 4.

(Abrasion Test)

By using the pellets and a heat press molding machine, a sheet-shape test piece of approximately 0.2 mm in thickness was prepared and cut out into a test piece of 10 cm×10 cm. The prepared test piece was fixed on a test bench of a Taber abrasion tester (No. 101, Taber type abrasion tester with an option, manufactured by Yasuda Seiki Seisakusho, Ltd.), and the abrasion test was carried out under the conditions of at a test piece surface temperature of 80° C., at a load of 500 g, using an abrasion wheel CS-10 (rotationally polished in 20 rotations with an abrasion paper #240), and at a rotation rate of 60 rpm, using the Taber abrasion tester. The weight of the test piece after 1,000 rotations was measured, and the same test piece was further subjected to the test of 4,000 rotations and thereafter, the weight thereof was measured. The abrasion loss was determined by the following formula.

$$\text{Abrasion loss (mg)}=M1-M2$$

M1: the weight of the test piece after the 1,000 rotations (mg)

M2: the weight of the test piece after the 4,000 rotations (mg)

(Water Vapor Permeability)

By using the pellets and a heat press molding machine, a sheet-shape test piece of approximately 0.2 mm in thickness was prepared. 18 g of water was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the water, and held at a temperature of 95° C. for 30 days, and thereafter, the test cup was taken out and allowed to stand at room temperature for 2 hours; thereafter, the amount of the mass lost was measured. The water vapor permeability (g·cm/$m^2$) was measured by the following formula.

$$\text{Water vapor permeability (g·cm/m}^2\text{)=the amount of the mass lost (g)×the thickness of the sheet-shape test piece (cm)/the permeation area (m}^2\text{)}$$

(Storage Elastic Modulus (E'))

The storage elastic modulus was determined by carrying out a dynamic viscoelasticity measurement using a DVA-220 (manufactured by IT Keisoku Seigyo K.K.). By using, as a sample test piece, a heat press molded sheet of 25 mm in length, 5 mm in width and 0.2 mm in thickness, the measurement was carried out under the condition of a temperature-increasing rate of 2° C./min, and a frequency of 10 Hz, and in the range of 30° C. to 250° C., and the storage elastic modulus (MPa) at 65° C. was identified.

(Amount of Recovery)

Measurement of the amount of recovery was performed according to the method described in ASTM D395 or JIS K6262:2013.

Approximately 2 g of the pellets was charged in a metal mold (inner diameter: 13 mm, height: 38 mm), and in that state, melted by hot plate press at 370° C. for 30 min, thereafter, water-cooled under a pressure of 0.2 MPa (resin pressure) to thereby prepare a molded article of approximately 8 mm in height. Thereafter, the obtained molded article was cut to prepare a test piece of 13 mm in outer diameter and 6 mm in height. The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 65° C. for 72 hours. The compression device was taken out from the electric furnace, and cooled to room temperature; thereafter, the test piece was dismounted. The collected test piece was allowed to stand at room temperature for 30 min, and the height of the collected test piece was measured and the amount of recovery was determined by the following formula.

$$\text{Amount of recovery (mm)}=t_2-t_1$$

$t_1$: the height of a spacer (mm)

$t_2$: the height of the test piece dismounted from the compression device (mm)

In the above test, $t_1$ was 3 mm.

(Resilience at 65° C.)

The 65° C. resilience was determined by the following formula from the result of the amount of recovery measurement at 65° C. and the result of the storage elastic modulus measurement at 65° C.

$$65^\circ\text{ C. Resilience (MPa)}=(t_2-t_1)/t_1\times E'$$

$t_1$: the height of a spacer (mm)

$t_2$: the height of the test piece dismounted from the compression device (mm)

E': the storage elastic modulus at 65° C. (MPa)

Formed articles with a high resilience at 65° C. are unlikely to deform even when a load is applied continuously for a long term.

(Permanent Compression Set)

The test and measurement were performed according to the method described in ASTM D395 or JIS K6262. A test piece of 13 mm in outer diameter and 6 mm in height was prepared as in the forming method described in the measurement of the amount of recovery. The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 65° C. for 72 hours. The compression device was taken out from the electric furnace, and cooled to room temperature; thereafter, the test piece was dismounted. The collected test piece was allowed to stand at room temperature for 30 min, and the height of the collected test piece was measured and the permanent compression set was determined by the following formula.

$$\text{Permanent compression set (\%)}=(t_0-t_2)/(t_0-t_1)\times 100$$

$t_0$: the original thickness of the test piece (mm)

$t_1$: the thickness of a spacer (mm)

$t_2$: the thickness of the test piece dismounted from the compression device (mm)

Formed articles with a low permanent compression set at are unlikely to deform even when a load is applied continuously for a long term.

(Tensile Strength after 60,000 Cycles)

The tensile strength after 60,000 cycles was measured by using a fatigue testing machine MMT-250NV-10, manufactured by Shimadzu Corp. By using the pellets and a heat press molding machine, a sheet of approximately 2.4 mm in thickness was prepared, and a sample in a dumbbell shape (thickness: 2.4 mm, width: 5.0 mm, measuring section length: 22 mm) was prepared by using an ASTM D1708 microdumbbell. The sample was mounted on measuring jigs and the measuring jigs were installed in a state of the sample being mounted in a thermostatic chamber at 110° C. The tensile operation in the uniaxial direction was repeated at a stroke of 0.2 mm and at a frequency of 100 Hz, and there was measured the tensile strength at every tensile operation (tensile strength at the time the stroke was +0.2 mm, unit: N).

A sheet high in the tensile strength after 60,000 cycles retains the high tensile strength even after loading is repeated 60,000 times, being excellent in the durability (110° C.) to repeated loads.

(Test of the Own Weight Deformation in the Melt Time)

By using the pellets and a heat press molding machine, there was prepared a formed article of 13 mm in diameter and approximately 6.5 mm in height. A test piece of 6.3 mm in height was prepared by cutting the obtained formed article. The prepared test piece was put in a SUS-made petri dish, and heated in an electric furnace at 330° C. for 30 min; and thereafter, the test piece together with the petri dish was water cooled. The diameter of the surface (bottom surface) of the test piece having contacted with the petri dish was measured by calipers, and the percentage increase of the bottom area was calculated by the following formula.

$$\text{Percentage increase of the bottom area (\%)}=\{\text{a bottom area of the test piece after the heating (mm}^2)-\text{a bottom area of the test piece before the heating (mm}^2)\}/\text{the bottom area of the test piece before the heating (mm}^2)\times 100$$

It is meant that the lower the percentage increase of the bottom area, the more hardly the formed article is deformed by its own weight in a melt time. The fluorine-containing copolymer which gives formed articles low in the bottom area percentage increase, even in the case of being formed by the extrusion forming method to prepare thick sheets and large pipes, is excellent in that there are obtained formed articles in a melt state which are hardly deformed and the formed articles which have a desired shape after being cooled and solidified.

(Sheet Moldability)

By using a ϕ14-mm extruder (manufactured by Imoto Machinery Co. Ltd.) and a T die, the pellets were formed to prepare a sheet. The extrusion conditions were as follows.

a) Take-up speed: 0.1 m/min b) Roll temperature: 120° C.

c) Sheet width: 70 mm d) Thickness: 1.00 mm e) Extrusion condition:

Cylinder screw diameter=14 mm, a single-screw extruder of L/D=20

Set temperature of the extruder: barrel section C-1 (330° C.), barrel section C-2 (350° C.), barrel section C-3 (360° C.), T die section (365° C.)

The extrusion forming of the fluorine-containing copolymer was continued until the fluorine-containing copolymer became enabled to be stably extruded from the extruder. Successively, by extruding the fluorine-containing copolymer, a sheet (70 mm wide) of 3 m or longer in length was prepared so that thickness became 1.00 mm. A portion of 2 to 3 m of the obtained sheet was cut out from one end of the sheet and there was prepared a test piece (1 m long and 70 mm wide) for measuring the fluctuation in the thickness. Then, there were measured thicknesses of 3 points in total on one end of the obtained sheet of a middle point in the width direction and 2 points separated by 25 mm from the middle point in the width direction. Further, there were measured 9 points in total of 3 middle points in the width direction spaced at intervals of 25 cm from the middle point in the width direction of the one end of the sheet toward the other end thereof, and 2 points separated by 25 mm in the width direction from the each middle point of the 3 middle points. Among the 12 measurement values in total, the case where the number of points having measurement values out of the range of ±10% of 1.00 mm was 1 or less was taken as good; and the case where the number of points having measurement values out of the range of ±10% of 1.00 mm was 2 or more was taken as poor.

(Pipe Moldability)

By using a φ30-mm extruder (manufactured by Tanabe Plastics Machinery Co. Ltd.), the pellets were extruded to obtain a pipe of 10.0 mm in outer diameter and 1.0 mm in wall thickness. The extrusion conditions were as follows.

a) Die inner diameter: 25 mm
b) Mandrel outer diameter: 13 mm
c) Sizing die inner diameter: 10.5 mm
d) Take-over speed: 0.4 m/min
e) Outer diameter: 10.0 mm
f) Wall thickness: 1.0 mm
g) Extrusion condition:
Cylinder screw diameter=30 mm, a single-screw extruder of L/D=22

Set temperature of the extruder: barrel section C-1 (350° C.), barrel section C-2 (370° C.), barrel section C-3 (380° C.), head section H-1 (390° C.), die section D-1 (390° C.), die section D-2 (390° C.)

The obtained pipe was observed and evaluated according to the following criteria. The appearance of the pipe was visually observed.

Good: The appearance was good.

Poor: The cross-section did not become circular and the appearance was poor, including that flattening occurred and uneven wall thickness emerged.

(Immersion Test in a Hydrogen Peroxide Aqueous Solution)

By using the pellets and a heat press molding machine, a sheet of approximately 0.2 mm in thickness was prepared and test pieces of 15 mm square were prepared. 10 sheets of the test pieces and 15 g of a 3-mass % hydrogen peroxide aqueous solution were put in a 50-mL polypropylene-made bottle, and heated in an electric furnace at 95° C. for 20 hours, and thereafter cooled to room temperature. The test pieces were removed from the hydrogen peroxide aqueous solution; and a TISAB solution (10) (manufactured by Kanto Chemical Co., Inc.) was added to the remaining hydrogen peroxide aqueous solution; and the fluorine ion concentration in the obtained hydrogen peroxide aqueous solution was measured by a fluorine ion meter. The fluorine ion concentration (concentration of fluorine ions having dissolved out) per sheet weight was calculated from an obtained measurement value according to the following formula.

Dissolving-out fluorine ion concentration (ppm by mass)=the measurement value (ppm)×the amount of the hydrogen peroxide aqueous solution (g)/the weight of the test piece (g)

TABLE 4

| | 80° C. Abrasion loss (mg) | Water vapor permeability (g·cm/m$^2$) | 65° C. Storage elastic modulus (MPa) | Amount of recovery (mm) | 65° C. Resilience (MPa) | Permanent compression set (%) | Tensile strength after 60,000 cycles (N) | Own weight deformation test (%) | Sheet moldability | Pipe moldability | Hydrogen peroxide aqueous solution immersion test (ppm by mass) |
|---|---|---|---|---|---|---|---|---|---|---|---|
| Example 1 | 14.2 | 11.9 | 357 | 0.467 | 55.6 | 84.4 | 9.89 | 43 | good | good | 3.8 |
| Example 2 | 12.7 | 12.7 | 337 | 0.501 | 56.3 | 83.3 | 9.55 | 22 | good | good | 2.4 |
| Example 3 | 11.9 | 12.0 | 330 | 0.513 | 56.4 | 82.9 | 9.25 | 16 | good | good | 2.4 |
| Comparative Example 1 | 16.6 | 9.1 | 387 | 0.475 | 61.3 | 84.2 | 9.37 | 53 | poor | | 4.2 |
| Comparative Example 2 | 15.4 | 12.0 | 350 | 0.361 | 42.1 | 88.0 | 8.85 | 69 | poor | — | 4.4 |
| Comparative Example 3 | 16.9 | 8.5 | 430 | 0.631 | 90.4 | 79.0 | 12.74 | 47 | good | — | 3.9 |
| Comparative Example 4 | 11.7 | 14.3 | 305 | 0.376 | 38.2 | 87.5 | 7.79 | 22 | good | — | 3.1 |
| Comparative Example 5 | 8.3 | 16.2 | 292 | 0.610 | 59.4 | 79.7 | 9.54 | 4 | — | — | 2.4 |

The invention claimed is:

1. A fluorine-containing copolymer, comprising: tetrafluoroethylene unit; hexafluoropropylene unit; and perfluoro(propyl vinyl ether) unit, wherein the copolymer has a content of hexafluoropropylene unit of 4.10 to 5.20 mol % with respect to the whole of the monomer units, a content of perfluoro (propyl vinyl ether) unit of 0.53 to 0.86 mol % with respect to the whole of the monomer units, and a melt flow rate at 372° C. of 0.7 to 2.5 g/10 min.

2. The fluorine-containing copolymer according to claim 1, wherein the copolymer has a content of hexafluoropropylene unit of 4.35 to 4.97 mol % with respect to the whole of the monomer units.

3. The fluorine-containing copolymer according to claim 1, wherein the copolymer has a content of perfluoro(propyl vinyl ether) unit of 0.66 to 0.78 mol % with respect to the whole of the monomer units.

4. The fluorine-containing copolymer according to claim 1, wherein the copolymer has a melt flow rate at 372° C. of 0.7 to 2.0 g/10 min.

5. The fluorine-containing copolymer according to claim 1, wherein the copolymer has a total number of —CF═$CF_2$, —$CF_2$H, —COF, —COOH, —$COOCH_3$, —$CONH_2$ and —$CH_2$OH of 50 or less per $10^6$ main-chain carbon atoms.

6. An extrusion formed article, comprising the fluorine-containing copolymer according to claim 1.

7. A transfer molded article, comprising the fluorine-containing copolymer according to claim 1.

8. A coated electric wire, comprising a coating layer comprising the fluorine-containing copolymer according to claim 1.

9. A formed article, comprising the fluorine-containing copolymer according to claim 1, wherein the formed article is a sheet or a pipe.

* * * * *